United States Patent
Ikuta et al.

(10) Patent No.: US 6,983,907 B2
(45) Date of Patent: Jan. 10, 2006

(54) BREAKING DEVICE FOR A DUAL BEARING REEL

(75) Inventors: Takeshi Ikuta, Sakai (JP); Ken'ichi Kawasaki, Sakai (JP); Kazuki Hiraizumi, Yamaguchi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/751,461

(22) Filed: Jan. 6, 2004

(65) Prior Publication Data

US 2004/0148843 A1   Aug. 5, 2004

(30) Foreign Application Priority Data

Jan. 6, 2003   (JP) .............................. 2003-000646
Jan. 6, 2003   (JP) .............................. 2003-000647

(51) Int. Cl.
     *A01K 89/02* (2006.01)
(52) U.S. Cl. ..................................... 242/288
(58) Field of Classification Search ................ 242/288, 242/223, 245, 287; 188/267, 268
     See application file for complete search history.

(56) References Cited

U.S. PATENT DOCUMENTS

| | | | | |
|---|---|---|---|---|
| 5,248,113 A | * | 9/1993 | Daniels ...................... | 242/246 |
| 5,363,565 A | * | 11/1994 | Kaneko ........................ | 33/719 |
| 5,427,323 A | * | 6/1995 | Kaneko et al. .............. | 242/223 |
| 5,560,560 A | * | 10/1996 | Hirose ......................... | 242/223 |
| 5,639,038 A | | 6/1997 | Hirose | |
| 5,639,039 A | * | 6/1997 | Ohno et al. ............... | 242/332.7 |
| 5,833,156 A | * | 11/1998 | Park et al. ................... | 242/289 |
| 6,045,076 A | | 4/2000 | Daniels | |
| 6,253,461 B1 | * | 7/2001 | Fischer ........................ | 33/762 |
| 6,412,722 B1 | | 7/2002 | Kreuser et al. | |
| 6,511,007 B1 | * | 1/2003 | Matsuura ..................... | 242/290 |

* cited by examiner

*Primary Examiner*—Emmanuel Marcelo
(74) *Attorney, Agent, or Firm*—Shinjyu Global IP Counselors, LLP

(57) ABSTRACT

A spool braking device for a dual bearing reel includes a spool brake unit, a spool control unit, and a tension detection unit that includes a rotational speed sensor. The spool control unit is arranged between a spool and a reel body, and it an electrically controllable unit that controls the spool. The tension detection unit detects the tension applied to fishing line that is released from the spool during casting. The spool control unit electrically controls the spool braking unit so that the spool braking unit brakes the spool with a first braking force of 50 to 100% of the maximum braking force during a first predetermined time period when the tension detected by the tension detection unit is at or below a first predetermined value.

20 Claims, 12 Drawing Sheets

BREAKING DEVICE FOR A DUAL BEARING REEL

BACKGROUND OF THE INVENTION

1. Field of the Invention

The present invention relates to a braking device. More specifically the present invention relates to a braking device for a dual bearing reel that brakes a spool rotatively mounted to a reel unit.

2. Background Information

A braking device is conventionally provided in dual bearing reels in order to brake the spool, and in particular is provided in bait casting reels in which a lure or the like is mounted to the end of a fishing line and cast. The braking device prevents backlash during casting. Many of these conventional braking devices are mechanical type braking devices, which use centrifugal force or magnetic force. However, mechanical braking devices only generate braking force in proportion to the rotational speed of the rotor or the square of the rotational speed, regardless of whether or not there is tension on the fishing line. Thus, mechanical braking devices sometimes generate braking force even at times when such a force is not needed. This may cause a reduction in the distance in which the lure will fly when cast.

Accordingly, electrically controlled braking devices are known in the art in which an electrical generation mechanism is provided between the spool and the reel unit, and which can be electrically controlled to adjust the braking force during casting, as seen, for example, in Japanese patent application publication H11-332436.

Conventional braking devices include a magnet, a coil, a rotational speed detection device, and a control device. The magnet is arranged on the spool. The coil is arranged on the reel unit. The rotational speed detection device detects the rotational speed of the spool. The control device controls the electrical current that flows in the coil. Conventional braking devices detect a peak in the rotational speed of the spool, and gradually increase the braking force at the point where the peak is exceeded. Tension on the fishing line will gradually decrease from a point close to the maximum rotational speed of the spool, and thus backlash can easily occur. Given this structure, in conventional braking devices, the spool is braked with a gradually stronger braking force after the peak of the rotational speed is detected in order to apply tension to the fishing line and prevent a backlash.

Problems that the Invention is to Solve

The aforementioned conventional braking devices detect a peak in the rotational speed and gradually brake the spool after the peak is exceeded in order to prevent backlash. Generally, the distance that the lure flies will be lengthened when the lure flies at a constant attitude in which the end of the lure that leads is the end that is opposite of the end that is tied to the fishing line. Since many lures are oblong in shape, it is thought that there will be little air resistance on the lure when in the attitude described above. Conversely, when the lure flies sideways or rotates while flying, the air resistance on the lure will increase and the distance that it will fly will not be as great. However, since the aforementioned conventional braking devices prevent backlash and extend the distance which the lure flies, it is difficult to make the lure fly with a stable attitude by simply braking the spool after the peak in the rotational speed.

In view of the above, it will be apparent to those skilled in the art from this disclosure that there exists a need for an improved braking device for a dual bearing reel. This invention addresses this need in the art as well as other needs, which will become apparent to those skilled in the art from this disclosure.

SUMMARY OF THE INVENTION

An object of the present invention is to provide a braking device in a dual bearing reel that can prevent backlash, stabilize the attitude of the lure, and allow the lure to be cast farther.

A braking device for a dual bearing reel according to a first aspect of the present invention is a device that brakes a spool that is rotatively mounted to a reel unit, and includes a spool braking unit, a tension detection unit, and a spool control unit. The spool braking unit is arranged between the spool and the reel unit, and is an electrically controllable unit that is configured to brake the spool. The tension detection unit detects the tension applied to fishing line that is released from the spool during casting. The spool control unit electrically controls the spool braking unit when the tension detected by the tension detection unit falls below a first predetermined value, so that the spool braking unit brakes the spool with a predetermined first braking force during a first predetermined time period.

In this braking device, the spool is not braked when the tension at the beginning of casting is high, and when the tension on the fishing line gradually decreases and is at or below a first predetermined value before a peak in the rotational speed is reached. However, the spool will be braked with a comparatively strong first braking force during the first predetermined time period. The first predetermined time period is, for example, about 0.1 to 0.5 seconds, and the spool is braked for only an extremely short time period with a strong predetermined first braking force that is, for example, 50 to 100% of the maximum braking force. The present inventors made various changes in brake timing and conducted casting experiments, and discovered that when the spool is braked for a very brief period of time with a strong braking force just before a peak in the rotational speed, the lure will reverse from at portion where it is engaged with the fishing line, the end of the lure opposite of the end attached to the fishing line will lead the direction of travel, and the lure will fly forward in this stable attitude. In addition, it was confirmed that when the attitude in which the lure flies is stable, the distance that the lure flies would increase. Furthermore, it was also discovered that with respect to the conventional method of braking the spool after a peak in the rotational speed was exceeded, the spool can be strongly braked before a peak in the rotational speed is detected by braking the spool with a strong braking force for a short period of time when the tension is at or below a predetermined value. Thus, when the spool is braked with a strong braking force before the peak, the tension that is at or below the first predetermined value can be rapidly increased, backlash can be prevented, and the lure will fly in a stable manner. Given this arrangement, backlash will be prevented, the attitude of the lure will be stabilized, and the lure can be cast farther.

The spool braking device for a dual bearing reel according to a second aspect of the present invention is the device of the first aspect, in which the spool braking unit includes a plurality of magnets, a plurality of serially connected coils, and a switch unit. The magnets have sequentially different polarities and are aligned in a rotational direction on the spool. The plurality of serially connected coils is mounted on the reel unit and disposed around a periphery of the magnets with gaps therebetween in a circumferential direction. The switch unit is connected to both ends of the serially connected plurality of coils. Furthermore, the spool control unit controls the spool braking unit by controlling the on/off state of the switch unit. Here, by controlling the on/off state of the switch unit during the rotation of the spool during casting or the like, the load with respect to the electric current flowing in the coils will change and the spool braking unit can control an arbitrary braking force.

The spool braking device for a dual bearing reel according to a third aspect of the present invention is the device of the first or second aspect, in which the first predetermined time period is in a range between 0.1 and 0.5 seconds. Here, the attitude of the lure can be stabilized and the lure can be cast farther by braking the spool with a strong first braking force for a relatively very short period of time.

The spool braking device for a dual bearing reel according to a fourth aspect of the present invention is the device disclosed in any of the first to third aspects, in which the first predetermined value is in a range between 0.5N and 1.5N. Here, the attitude of the lure can be made more stable, and the lure can be cast farther.

The spool braking device for a dual bearing reel according to a fifth aspect of the present invention is the device disclosed in any of the second to fourth aspects, in which the spool control unit controls the on/off state of the switch unit by PWM (pulse width modulation). Here, the braking force can be controlled with good precision by PWM control.

The spool braking device for a dual bearing reel according to a sixth aspect of the present invention is the device disclosed in the fifth aspect, in which when the spool control unit controls the on/off state of the switch unit at a 50 to 100% duty, the spool will be braked with a first braking force by the spool braking unit. Here, a comparatively strong first braking force can adjust the attitude of the lure.

The spool braking device for a dual bearing reel according to a seventh aspect of the present invention is the device disclosed in any of the first to sixth aspects, in which the tension detection unit includes a speed detection unit and a torque computation unit. The speed detection unit optically detects the rotational speed of the spool. The torque computation unit computes the drive torque that rotates the spool by the rate of change of the rotational speed detected by the speed detection unit and the moment of inertia of the spool. Further, the tension is detected by the computed drive torque. Here, the torque is computed by the rate of change of the optically detected rotational speed and the rotational moment of the spool. If the torque is computed, then the tension can be computed by the radius of the point of application of the fishing line on the spool (normally in a range between 15 to 25 mm). The tension can be detected without contact and with good accuracy because it is detected and calculated using the optically detected rotational speed. In other words, detection of tension does not affect the flying distance during casting because the tension of the fishing line can be detected without contact with the fishing line.

The spool braking device for a dual bearing reel according to an eighth aspect of the present invention is the device disclosed in any of the first to seventh aspects, in which after the spool control unit controls the spool braking unit so that the spool is braked with the first braking force during the first predetermined time period, the spool control unit controls the spool braking unit so that the spool is braked during a second predetermined time period with a second braking force that is weaker than the first braking force. Further, the second braking force changes such that the second braking force gradually becomes even weaker. Here, since a weak second braking force that becomes gradually weaker is applied after the spool is braked with a strong first braking force for a very short period of time, thereby stabilizing the attitude of the lure, the stabilized flight of the lure will be maintained without unneeded braking. Given this arrangement, the distance that the lure will fly can be further increased.

The spool braking device for a dual bearing reel according to a ninth aspect of the present invention is the device of the seventh aspect, in which the spool control unit determines the first braking force based on the rotational speed of the spool detected by the speed detection unit. Here, even if the rotational speed changes due to the casting method used, the lure can be cast with a stable flight attitude at the same settings. For example, even when casting is performed in which the initial velocity of the spool is low (such as pitching), the distance that the lure will fly will not be harmed because the first braking force will be reduced in accordance with the rotational speed.

The spool braking device for a dual bearing reel according to a tenth aspect of the present invention is the device of the eighth aspect, in which the second predetermined time period changes in accordance with the rotational speed of the spool. Here, since the braking time of the second braking force will change due to the rotational speed of the spool, the distance that the lure will fly can be increased by, for example, shortening the braking time when the rotational speed is slow.

The spool braking device for a dual bearing reel according to an eleventh aspect of the present invention is the device disclosed in any of the eighth or tenth aspects, in which the second predetermined time period is in a range between 0.3 and 2 seconds. Here, the lure is easily maintained in a stable attitude because the braking time due to the second braking force is longer than the braking time of the first braking force.

The spool braking device for a dual bearing reel according to a twelfth aspect is the device disclosed in any of the first to eleventh aspects, which further includes pattern memory means and a pattern selection means. The pattern memory means has stored therein a plurality of control patterns, each of which is different at least in one of the first braking force, first predetermined value of the tension, and first predetermined time period. The pattern selection means selects one control pattern from the plurality of control patterns stored in the pattern memory means. Further, the spool control unit controls the spool braking unit based on the control pattern selected by the pattern selection unit. Here, an optimal braking force can be selected in accordance with fishing conditions, such as the mass of the lure and the strength and direction of the wind, because the control pattern can be selected from the plurality of control patterns.

The spool braking device for a dual bearing reel according to a thirteenth aspect of the present invention is the device disclosed in one of the eighth, tenth, and eleventh aspects, which further includes a tension pattern setting means that sets a tension pattern, based on which the second braking force is determined. Further, the spool control unit corrects the second braking force in response to the tension pattern while the spool control unit controls the spool braking unit during the second predetermined time period with the second braking force. Here, the second braking force can be corrected when the tension changes with respect to the set tension pattern, and thus even if the tension changes due to the effects of the wind and the like, the lure can be maintained in an optimal attitude and the lure can be cast farther.

The spool braking device for a dual bearing reel according to a fourteenth aspect is the device disclosed in the eighth, tenth, eleventh, or the thirteenth aspect, which further includes first braking pattern setting means and second braking pattern setting means. The first braking pattern setting means sets at least one first braking pattern that indicates at least the first braking force. The second braking pattern setting means sets at least one second braking pattern that indicates at least the first braking force that is smaller than the first braking force of the first braking pattern. Further, the spool control unit that electrically controls the spool braking unit so that the spool is braked with at least one first braking pattern when the spool rotational speed before braking is equal to or greater than a predetermined value and at least one second braking pattern when the spool rotational speed is less than the predetermined value.

With this braking device, the spool is braked in accordance with the first braking pattern when a comparatively fast cast (long cast) is performed in which the rotational speed of the spool before braking is equal to or greater than the predetermined value. Further, the spool is braked in accordance with the second braking pattern when a comparatively slow cast (short cast) is performed in which the rotational speed of the spool before braking is below the predetermined value. Here, the spool will be braked in accordance with either of two braking patterns in accordance with the rotational speed of the spool at the beginning of casting, even with the same settings. Given this structure, it will be unnecessary to adjust manually the braking force even if casting is performed in which the spool rotational speed is different at the beginning of casting, and thus the burden on the fisherman can be reduced.

The spool braking device for a dual bearing reel according to a fifteenth aspect is the device disclosed in the fourteenth aspect, in which the first braking pattern setting unit includes first pattern storage means in which at least one first braking pattern is stored, and first pattern read-out means that reads out the stored first braking patterns. Here, at least one first braking pattern is stored in advance, and thus the braking response can be made quicker compared to when the first braking pattern is recognized or computed.

The spool braking device for a dual bearing reel according to a sixteenth aspect of the present invention is the device described in the fifteenth aspect, where the first pattern storage means has stored therein a plurality of first braking patterns that correspond to different braking forces. The first braking pattern setting means further includes pattern selection means that selects any of the plurality of first braking patterns stored in the first pattern storage means. Further, the first pattern read-out means reads out the selected first braking pattern from the first pattern storage means. Here, the spool braking unit can brake in accordance with the plurality of first braking patterns, and thus the braking force can be freely adjusted in accordance with the casting method, the weight of the tackle, or the skill of the fisherman. In addition, the braking response will be quicker because the first braking pattern is set by simply reading out a first braking pattern selected from the plurality of first braking patterns.

The spool braking device for a dual bearing reel according to a seventeenth aspect of the present aspect is the device described in the sixteenth aspect, in which one of the plurality of first braking patterns stored in the first pattern storage means is a reference first braking pattern. The spool braking device further includes first braking pattern setting means that includes first braking pattern computation means and pattern selection means. The first braking pattern computation means computes a plurality of different first braking patterns from the reference first braking pattern. The pattern selection means selects a first braking pattern from the reference first braking pattern and the computed plurality of first braking patterns. The first braking pattern setting means sets a first braking pattern that the pattern selection means selected from the reference first braking pattern and the computed first braking patterns stored in the first braking pattern storage means. Here, the spool braking unit can brake according to the plurality of first braking patterns, and thus the braking force can be freely adjusted in accordance with the casting method, the weight of the tackle, or the skill of the fisherman. In addition, only the reference first braking pattern may be stored, and thus the storage capacity can be reduced and the structure of the device can be simplified.

The spool braking device for a dual bearing reel according to an eighteenth aspect of the present invention is the device described in the seventeenth aspect, in which the first braking pattern computation means computes the plurality of first braking patterns such that the plurality of first braking patterns have braking forces that are smaller than the braking force of the reference braking pattern. Here, the computation process will be made easier and the time needed for computation can be shortened because the plurality of first braking patterns is computed by shift processing.

The spool braking device for a dual bearing reel according to a nineteenth aspect of the present invention is the device disclosed in any of the fourteenth to eighteenth aspects, in which the second braking pattern setting means includes second pattern storage means in which at least one second braking pattern is stored, and second pattern read-out means that reads out the stored second braking pattern. Here, the process of setting the second braking pattern can be shortened because the second pattern is also stored in a storage unit.

The spool braking device for a dual bearing reel according to a twentieth aspect of the present invention is the device disclosed in any of the fourteenth to eighteenth aspects, in which the second braking pattern setting means computes and sets the second braking pattern based on the first braking pattern. Here, the second braking pattern is read or computed together with the first braking pattern, and thus the storage the second braking pattern will be unnecessary, the storage capacity of the device can be reduced, and the structure of the device can be simplified.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration of the Reel

Figure 1:
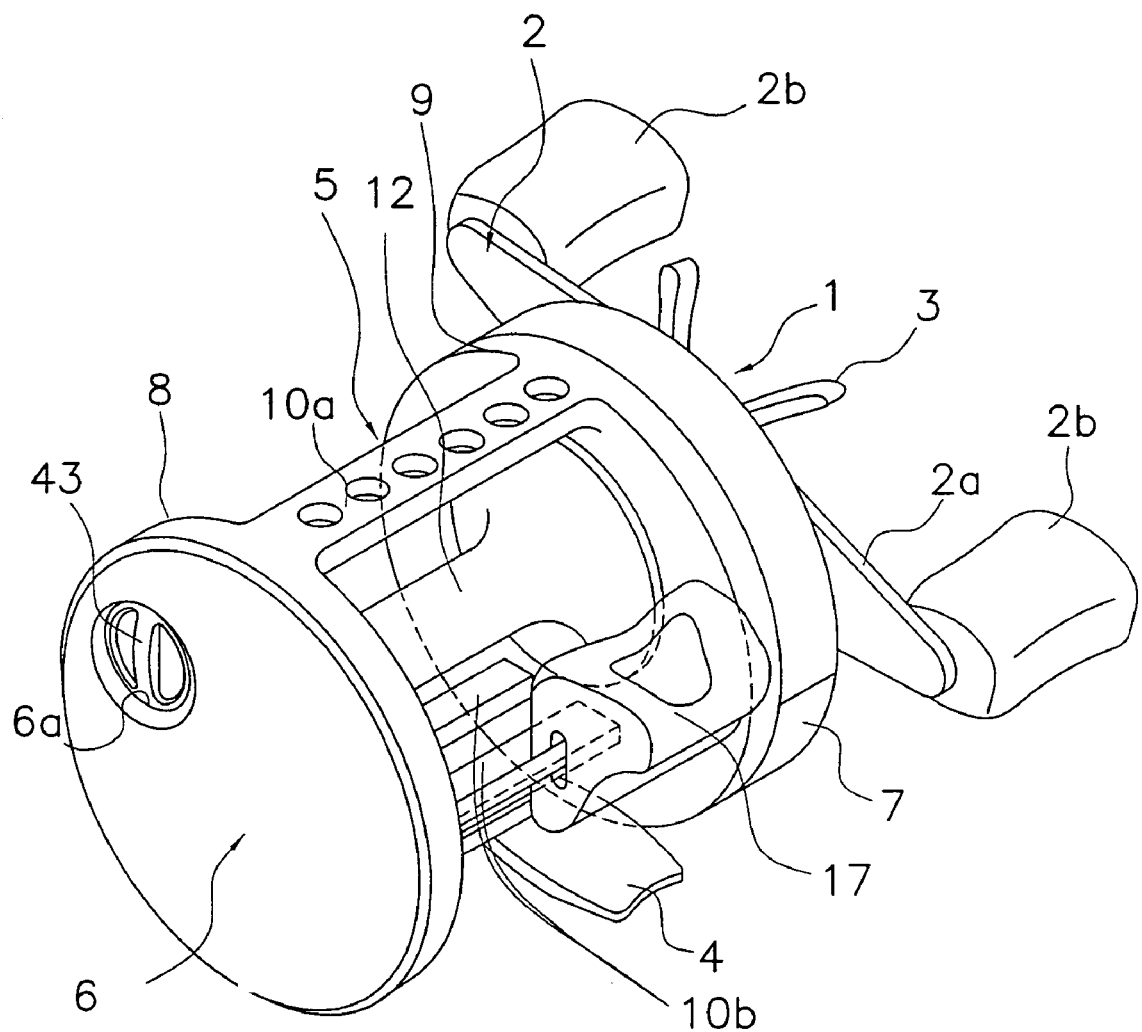
FIG. 1 is a perspective view of a dual bearing reel in accordance with a first embodiment of the present invention.
Figure 2:
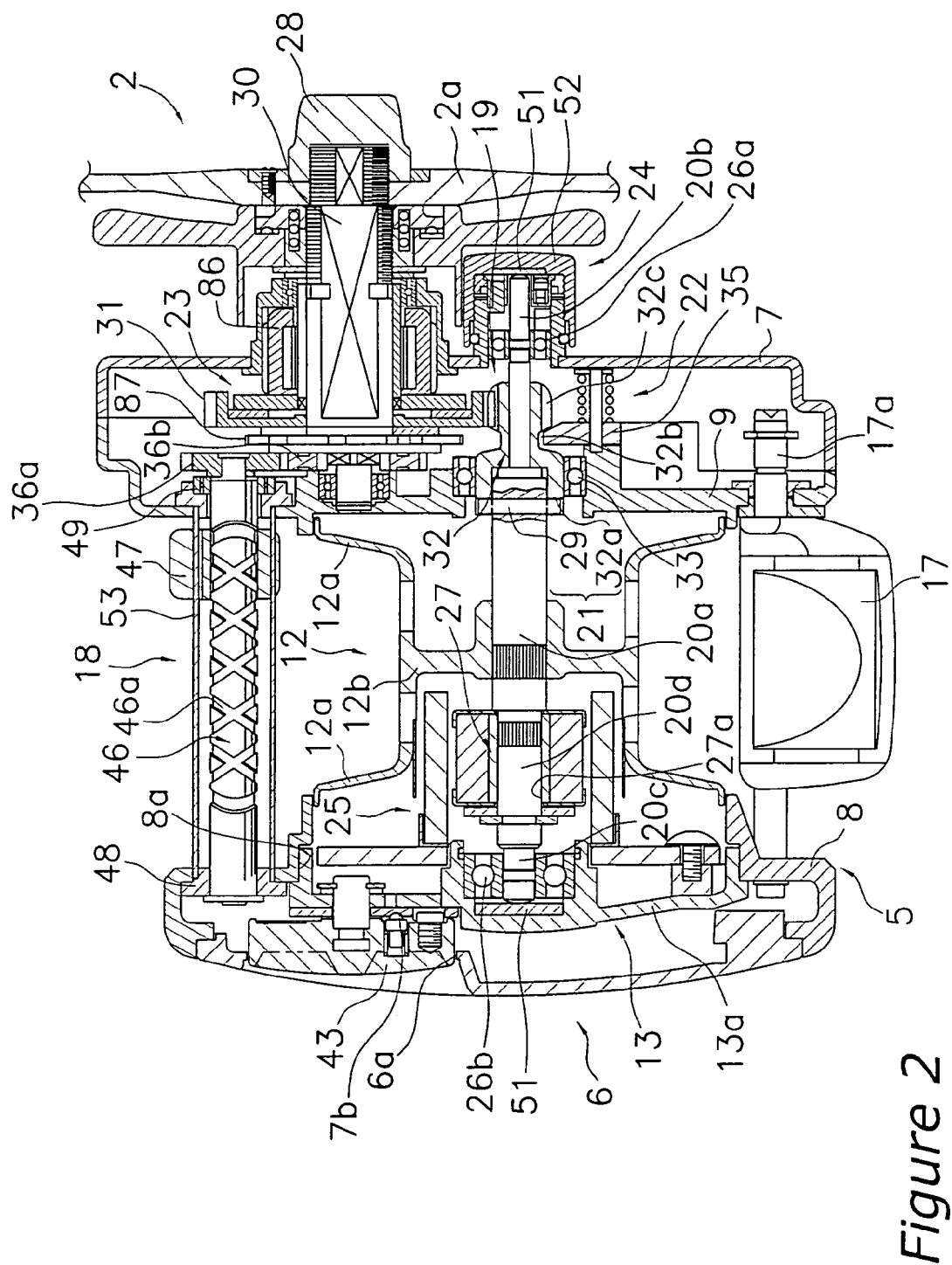
FIG. 2 is a cross-sectional view of the dual bearing reel of FIG. 1.

In FIG. 1 and FIG. 2, a dual bearing reel according to a preferred embodiment of the present invention is a round dual bearing reel for bait casting. This reel includes a reel unit 1, a handle 2, and a star drag 3. The handle 2 is provided to rotate a spool 12 and is disposed on the side of the reel unit 1. The star drag 3 is provided to adjust drag and is disposed on the same side of the reel unit 1 as the handle 2.

The handle 2 is preferably of the double-handle type and has a plate-shaped arm portion 2a and knobs 2b that are rotatively mounted to both ends of the arm portion 2a. As shown in FIG. 2, the arm portion 2a is non-rotatively mounted to the end of a handle shaft 30, and is fastened to the handle shaft 30 by a nut 28.

Referring again to FIGS. 1 and 2, the reel unit 1 is, for example, made of a metal such as an aluminum alloy or a magnesium alloy. The reel unit 1 includes a frame 5, a first side cover 6, and a second side cover 7. The first and second sidecovers 6 and 7 are mounted to both sides of the frame 5. The spool 12 is provided to wind winding fishing line, and is rotatively mounted on a spool shaft 20 (see FIG. 2) inside the reel unit 1. When viewed from the exterior in the spool shaft direction, the first side cover 6 is circular or round in shape, and the second side cover 7 is formed with two disks that intersect each another.

As shown in FIG. 2, the spool 12, a clutch lever 17, and a level wind mechanism 18 are disposed inside the frame 5. The clutch lever 17 functions as a thumb rest when thumbing the fishing line, and the level wind mechanism 18 serves to wind uniformly fishing line around the spool 12. A gear mechanism 19, a clutch mechanism 21, a clutch control mechanism 22, a drag mechanism 23, and a casting control mechanism 24 are disposed in the space between the frame 5 and the second side cover 7. The gear mechanism 19 transmits rotational force from the handle 2 to the spool 12 and the level wind mechanism 18. The clutch control mechanism 22 controls the clutch mechanism 21 in response to the operation of the clutch lever 17. The drag mechanism 23 brakes the spool 12. The casting control mechanism 24 adjusts the resistance that occurs when the spool 12 rotates. In addition, an electrically controlled brake mechanism or electrically controllable spool braking device 25 that pre- vents backlash when casting the fishing line is disposed between the frame 5 and the first side cover 6.

As seen in FIG. 1, the frame 5 includes a pair of side plates 8 and 9 disposed such that they are opposite each other across a predetermined gap, and upper and lower connectors 10a and 10b that unitarily connect the side plates 8 and 9. As seen in FIG. 2, a circular opening 8a is formed slightly above the center of the side plate 8. A spool support portion 13 that forms a portion of the reel unit 1 is screwed into the opening 8a.

Figure 3:
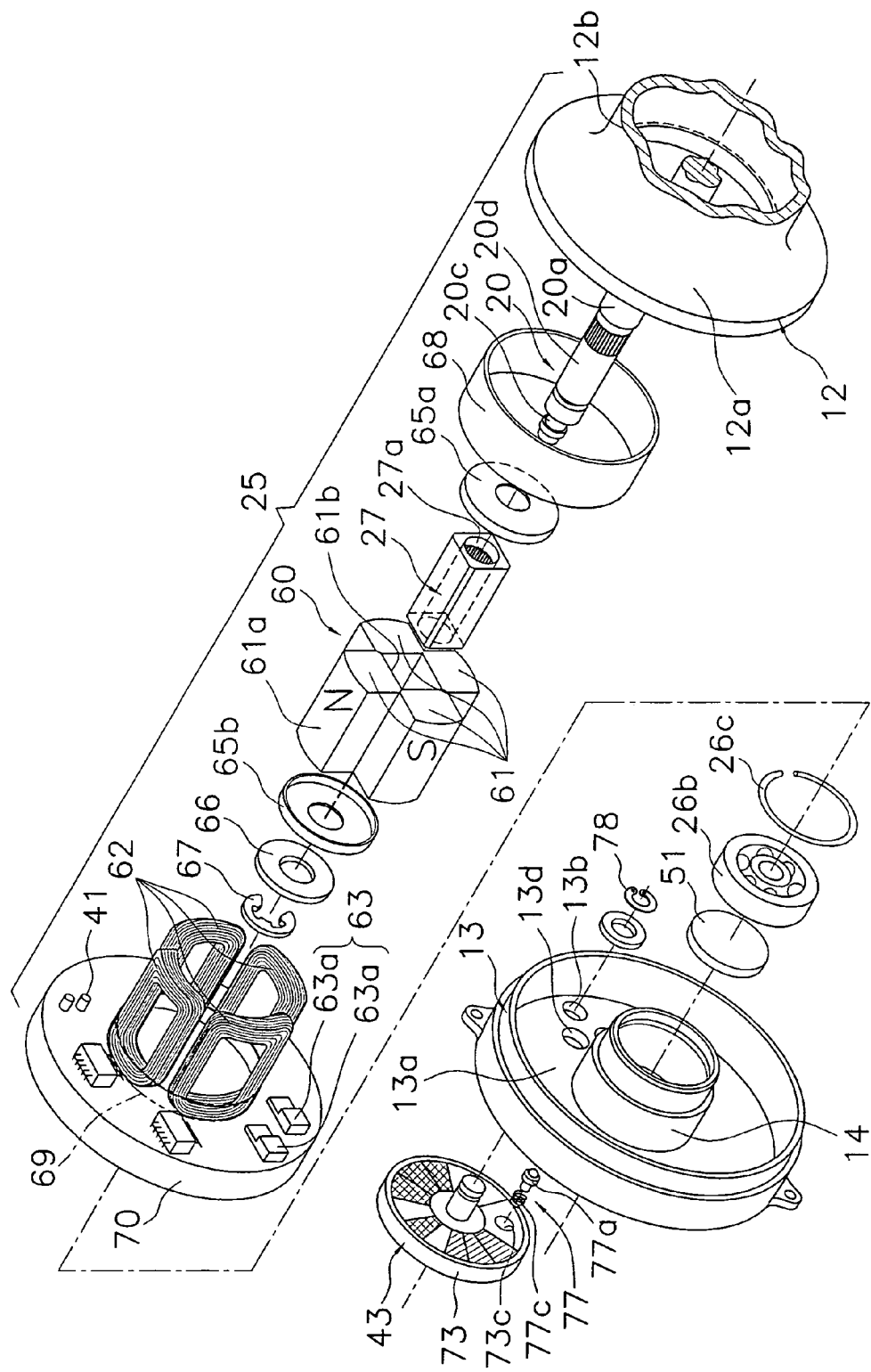
FIG. 3 is an exploded perspective view of a spool brake mechanism of the dual bearing reel of FIG. 1.
Figure 4:
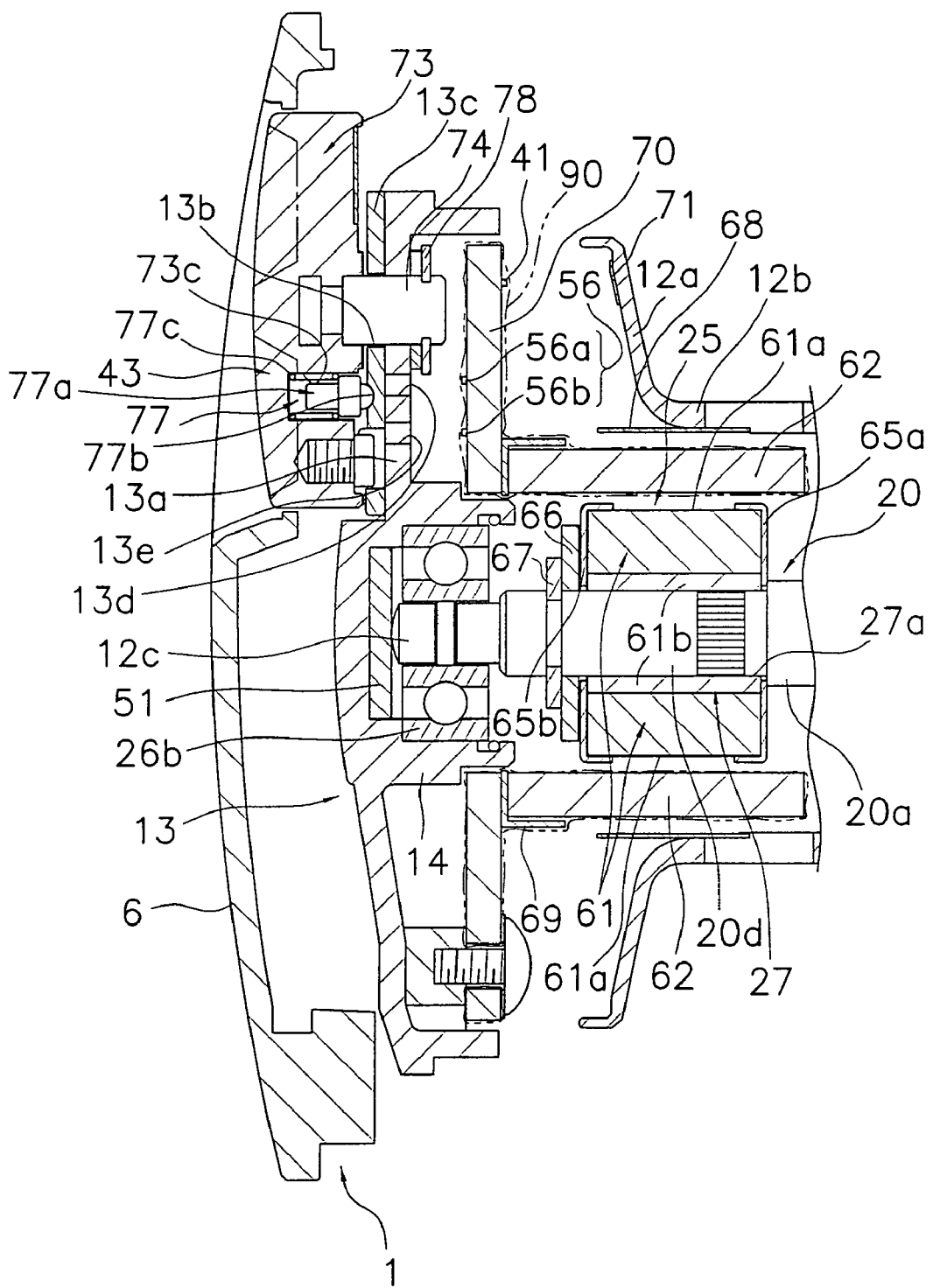
FIG. 4 is an enlarged cross-sectional view of the spool brake mechanism.

As shown in FIGS. 3 and 4, the spool support portion 13 is a flat and approximately closed end tubular portion that is detachably mounted in the opening 8a. A tubular bearing accommodation portion 14 that projects inward is unitarily formed on the central portion of a wall portion 13a of the spool support portion 13. A bearing 26b that rotatively supports one end of the spool shaft 20 is disposed on the inner peripheral surface of the bearing accommodation portion 14. In addition, a friction plate 51 of the casting control mechanism 24 is mounted on the bottom, i.e. the side closest to the first side cover 6, of the bearing accommodation portion 14. The bearing 26b is engaged with the bearing accommodation portion 14 by a retaining ring 26c that is preferably made of a wire material.

As shown in FIG. 1, the upper connecting portion 10a is mounted in the same plane as the perimeter of the side plates 8 and 9, and a pair of front and rear lower connecting portions 10b is disposed inwardly from the perimeter. A rod mounting leg 4 that is, for example, made of a metal such as an aluminum alloy and extends from front to rear is riveted to the lower connecting portions 10b. The rod mounting leg 4 mounts the reel to a fishing rod.

The first side cover 6 is screwed to the side plate 8 by screw members (not shown in the figures) that are inserted from the second side cover 7 side. A circular opening 6a is formed in the first side cover 6. A brake switch knob 43 (described below) is disposed in the circular opening 6a.

As shown in FIG. 2, the spool 12 has saucer-shaped flange portions 12a formed on both end portions thereof and a tubular bobbin 12b formed between the two flange portions 12a. The outer peripheral surface of the flange portion 12a on the left side of FIG. 2 is disposed so that a slight gap is open on the inner peripheral side of the opening 8a, which serves to prevent line snags. The spool 12 is non-rotatably coupled with, for example a serration coupling, to the spool shaft 20 that passes through the inner peripheral side of bobbin 12b. The method of attachment is not limited to serration coupling, and other coupling methods such as key coupling or spline coupling can be employed as well.

The spool shaft 20 is preferably made of a non-magnetic metal such as, for example, SUS 304, and passes through the side plate 9 and extends beyond the second side cover 7. The end of the spool shaft 20 that extends beyond the second side cover 7 is rotatively supported by a bearing 26a on a boss 7b mounted on the second side cover 7. In addition, the other end of the spool shaft 20 is rotatively supported by the bearing 26b as described above. A large diameter portion 20a is formed in the center of the spool shaft 20. Further, small diameter portions 20b and 20c that are supported by the bearings 26a and 26b, respectively, are formed on both ends of the large diameter potion 20a. Note that the bearings 26a and 26b are, for example, made preferably of SUS 440 that has been coated with a corrosion resistant film.

Furthermore, as seen in FIGS. 2 and 3, a magnet mounting portion 20d that mounts magnets 61 (described below) is formed between the small diameter portion 20c and the large diameter portion 20a on the left side of FIG. 2. The magnet mounting portion 20d has an outer diameter that is larger than the small diameter portion 20c and smaller than the large diameter portion 20a. A magnet retaining portion 27 is non-rotatably coupled to the magnet mounting portion 20d by for example a serration coupling, and is made of a magnetic material formed by electroless plating nickel onto the surface of an iron material such as SUM (extruded and cut). Since such method of manufacturing a magnetic retaining portion is well know in the art, further explanation will be omitted herein. The magnet retaining portion 27 is a rectangular member having a through hole 27a formed therein. The magnet retaining portion 27 is preferably square shaped when viewed in cross-section from a direction perpendicular to the through hole 27a. The magnet mounting portion 20d passes through the center of the magnetic retaining portion 27. The method of attaching the magnet retaining member 27 is not limited to serration coupling, and other coupling methods such as key coupling or spline coupling can be employed as well.

The right end of the large diameter portion 20a of the spool shaft 20 is disposed at a pass through portion of the side plate 9, and an engagement pin 29 that forms a part of the clutch mechanism 21 is fixed at this location. The engagement pin 29 passes through the large diameter portion 20a along its diameter and projects outward from both sides in the radial direction.

As shown in FIG. 2, the clutch lever 17 is disposed to the rear of the spool 12 and between the rear portions of the pair of side plates 8 and 9. The clutch lever 17 slides vertically between the side plates 8 and 9. An engagement shaft 17a passes through the side plate 9 and is unitarily formed with the clutch lever 17 on the side of the clutch lever 17 where the handle 2 is mounted. The engagement shaft 17a is engaged with the clutch control mechanism 22.

As shown in FIG. 2, the level wind mechanism 18 is disposed between the two side plates 8 and 9 in front of the spool 12, such that the level wind mechanism 18 and the clutch lever 17 interpose the spool 12. The level wind mechanism 18 includes a threaded shaft 46 and a fishing line guide portion 47. Intersecting helical grooves 46a are formed on an outer periphery of the threaded shaft 46. The fishing line guide portion 47 reciprocally moves back and forth relative to the side plate 9 on the threaded shaft 46 in the spool shaft direction and guides the fishing line. The two ends of the threaded shaft 46 are rotatively supported by shaft support portions 48 and 49 mounted on the side plates 8 and 9, respectively. As shown in FIG. 2, a gear member 36a is mounted on the right end of the threaded shaft 46. The gear member 36a meshes with a gear member 36b that is non-rotatively mounted on the handle shaft 30. With this configuration, the threaded shaft 46 rotates in association with the rotation of the handle shaft 30 in the line winding direction.

The fishing line guide portion 47 is disposed around the periphery of the threaded shaft 46, and is guided in the spool shaft 20 direction by a pipe member 53 and a guide shaft (not shown in the figures). A portion of the pipe member 53 is cut away over its entire axial length, and the guide shaft is disposed above the threaded shaft 46. An engagement member (not shown in the figures) which engages with the helical grooves 46a is rotatively mounted on the fishing line guide portion 47 and reciprocally moves back and forth in the spool shaft direction by the rotation of the spool shaft 46.

The gear mechanism 19 includes a handle shaft 30, a main gear 31 fixedly coupled to the handle shaft 30, and a tubular pinion gear 32 that meshes with the main gear 31. The handle shaft 30 is rotatively mounted on the side plate 9 and the second side cover 7. The handle shaft 30 is prohibited from rotating in the line releasing direction by a roller-type one-way clutch 86 and a ratchet-type one-way clutch 87. The one-way clutch 86 is mounted between the second side cover 7 and the handle shaft 30. The main gear 31 is rotatively mounted on the handle shaft 30, and is coupled to the handle shaft 30 via the drag mechanism 23.

The pinion gear 32 extends from outside the side plate 9 to the inside thereof, is a tubular member through which the spool shaft 20 passes, and is mounted on the spool shaft 20 so as to be moveable in the axial direction. In addition, the left side of the pinion gear 32 in FIG. 2 is rotatively and movably supported in the axial direction on the side plate 9 by a bearing 33 on the side plate 9. A meshing groove 32a that meshes with the engagement pin 29 is formed in the left end of the pinion gear 32 in FIG. 2. The meshing groove 32a and the engagement pin 29 form the clutch mechanism 21. In addition, a constricted portion 32b is formed in the central portion of the pinion gear 32. Further, a gear portion 32c that meshes with the main gear 31 is formed on the right end of the pinion gear 32.

The clutch control mechanism 22 includes a clutch yoke 35 that moves in a direction that is substantially parallel to the direction in which the spool shaft 20 extends. In addition, the clutch control mechanism 22 also includes a clutch return mechanism (not shown in the figures), which activates the clutch mechanism 21 when the spool 12 rotates in the line winding direction.

The casting control mechanism 24 includes a plurality of friction plates 51 and a braking cap 52. The friction plates 51 are disposed on both ends of the spool shaft 20. The braking cap 52 adjusts the force with which the friction plates 51 are pressed against the spool shaft 20. The friction plate 51 on the left end is mounted inside the spool support portion 13.

Configuration of the Spool Brake Mechanism

Figure 7:
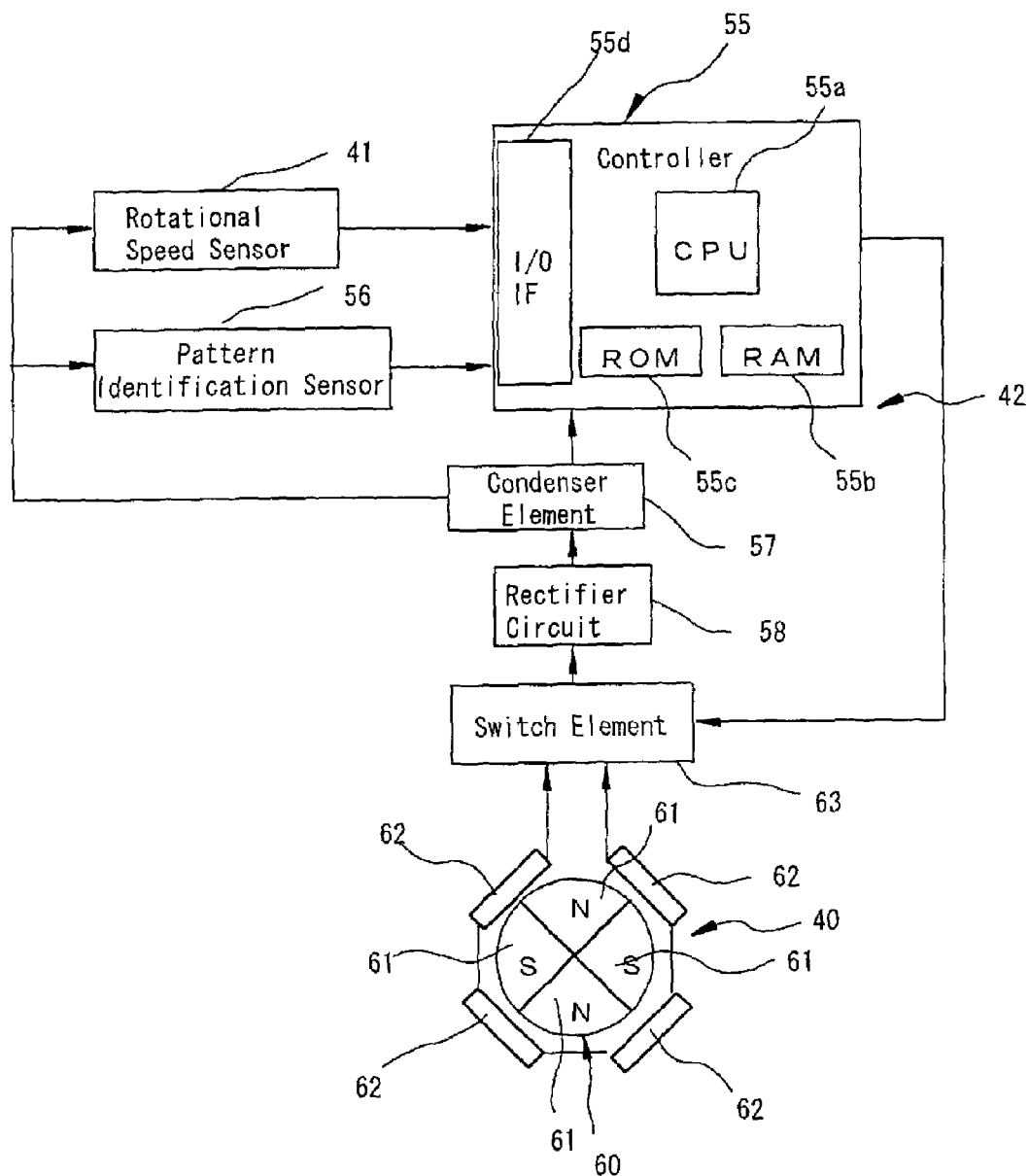
FIG. 7 is view of a control block diagram of the spool brake mechanism.

As shown in FIGS. 3, 4, and 7, the spool brake mechanism 25 includes a spool brake unit 40, a rotational speed sensor 41, a spool control unit 42, and the brake switch knob 43. The spool brake unit 40 is arranged between the spool 12 and the spool shaft 20. The rotational speed sensor 41 detects tension that is applied to the fishing line. The spool control unit 42 electrically controls the spool brake unit 40 with any one of eight braking modes, and the brake switch knob 43 serves to select the eight braking modes.

The spool brake unit 40 is an electrically controllable unit that brakes the spool 12 by generating electricity. The spool brake unit 40 is composed of a rotor 60, four coils 62, and a switch element or switch unit 63. The rotor 60 includes four magnets 61 disposed around the spool shaft 20 in the rotational direction. The four coils 62 are disposed facing the outer periphery of the rotor 60, and are serially connected to one another. Both ends of the plurality of serially connected coils 62 are connected to the switch element 63. The spool brake unit 40 brakes the spool 12 by activating and deactivating the flow of electricity generated by the relative rotation between the magnets 61 and the coil 62 using the switch element 63. The braking force generated by the spool brake unit 40 will increase in accordance with the length of time the switch element 63 has been activated.

The four magnets 61 of the rotor 60 are disposed side by side in the circumferential direction. Further, the polarities of the magnets 61 are sequentially different. The magnets 61 are approximately or exactly the same length as that of the magnet retaining portion 27. Outer surfaces 61a of the magnets 61 are arc-shaped in a cross-sectional view perpendicular to an axis of rotation, and inner surfaces 61b thereof are planar. The inner surfaces 61b are disposed so that they are in contact with the outer peripheral surfaces of the magnet retaining portion 27 of the spool shaft 20. Both ends of the magnets 61 are interposed between disk-shaped and plate-shaped cap members 65a and 65b that are made of a non-magnetic metal such as, for example, SUS 304. The cap members 65a and 65b are non-rotatably mounted to the magnet retaining portion 27 with respect to the spool shaft 20. Since the magnets 61 are retained by the cap members 65a and 65b that are made from a non-magnetic metal, the assembly of the magnets 61 onto the spool shaft 20 can be made easier without weakening the magnetic force of the magnets 61, and the comparative strength of the magnets 61 after assembly can be increased.

The distance between the left end surface of the magnets 61 in FIG. 4 and the bearing 26b is 2.5 mm or greater. The cap member 65a on the right side of FIG. 4 is interposed between the step between the large diameter portion 20a of the spool shaft 20 and the magnet mounting portion 20d and the magnet retaining portion 27. The step between the large diameter portion 20a and the magnet mounting portion 20d limits the rightward movement of the cap member 65a.

A washer member 66 is mounted to the left side of the cap member 65b and disposed between the cap member 65b and the bearing 26b. The washer member 66 is made from a magnetic material formed by electroless nickel plating the surface of an iron material such as SPCC (plate). The washer member 66 is retained by, for example, an e-shaped retaining ring 67 that is mounted to the spool shaft 20. The washer member 66 preferably has a thickness between 0.5 mm and 2 mm, and the outer diameter thereof is between 60% and 120% of the outer diameter of the bearing 26b. It will be difficult for the bearing 26b disposed near the magnets 61 to become magnetized due to the arrangement of the magnetic washer 66. Given this structure, it will be difficult for the magnets 61 to have an impact on the ability of the spool 12 to rotate when the spool 12 is freely rotating, even if the magnets 61 are disposed nearby the bearing 26b. In addition, it will also be difficult for the bearing 26b to become magnetized because the distance between the magnets 61 and the bearing 26b is 2.5 mm or greater.

A sleeve 68 is mounted on the inner peripheral surface of the bobbin 12b in a position that faces the magnets 61, and is preferably made from a magnetic material formed by electroless nickel plating the surface of an iron material such as SUM (extruded and cut). The sleeve 68 is fixedly attached to the inner peripheral surface of the bobbin 12b with a suitable fixing unit such as press fitting or adhesive. When this type of magnetic sleeve 68 is disposed opposite the magnets 61, electrical generation and brake efficiency are increased because magnetic flux from the magnets 61 converge on and pass through the coils 62.

The coils 62 are of a coreless type, which prevents cogging and makes make the rotation of the spool 12 smooth. Furthermore, a yoke is not provided. The coils 62 are wound into approximate rectangular shapes so that the wrapped core wires face the magnets 61 and are disposed inside the magnetic fields of the magnets 61. The four coils 62 are serially connected, and both ends thereof are connected to the switch element 63. The coils 62 are curved along the rotational direction of the spool 12 into arc-shapes that are substantially concentric with respect to the spool shaft 20 so that the distance between the outer surfaces 61a of the magnets 61 and the coils 62 is approximately uniform. Given this structure, the gap between the coils 62 and the magnets 61 during rotation can be uniformly maintained. The four coils 62 are held in place by a disk-shaped and plate-shaped coil holder 69 that is made of a non-magnetic material such as, for example, SUS 304 or the like. The coil holder 69 is fixedly attached to a circuit board 70 (described below) that forms the spool control unit 42. Note that in FIG. 3, the coil holder 69 is illustrated with dashed lines in order to show the coils 62. Thus, the four coils 62 are easily mounted to the circuit board 70 because the coils 62 are mounted on the non-magnetic coil holder 69, and the magnetic flux from the magnets 61 will not be disturbed because the coil holder 69 is made from a non-magnetic material.

The switch element 63 includes, for example, two parallel connected FET (field effect transistors) 63a that can switch on and off at a high speed. The serially connected coils 62 are connected to each drain terminal of the FET 63a. The switch element 63 is also mounted to the circuit board 70.

The rotational speed sensor 41 employs, for example, a reflection type electro-optical switch that includes a light portion and a receptor portion, and is fixedly attached on a surface of the circuit board 70 that faces the flange portion 12a of the spool 12. A read-out pattern 71 is fixedly attached on the outer side surface of the flange portion 12a by a suitable method such as printing, applying a sticker, or attaching a reflective plate, and serves to reflect light illuminated from the light portion. Signals from the rotational speed sensor 41 allow the rotational speed to be detected so that tension can be applied to the fishing line. The rotational speed sensor 41 functions as a speed detection unit, which is part of a tension detection unit. The rotational speed sensor 41 is arranged between the flange portion 12a of the spool 12 and the rear surface of the first side cover 6, so that the rotational speed sensor 41 is not exposed to the outside. Thus, it is possible to prevent a decrease in the sensitivity of the electro-optical switch that occurs due to the surface of the switch being covered with liquid sprays or crystals of salts.

Figure 5:
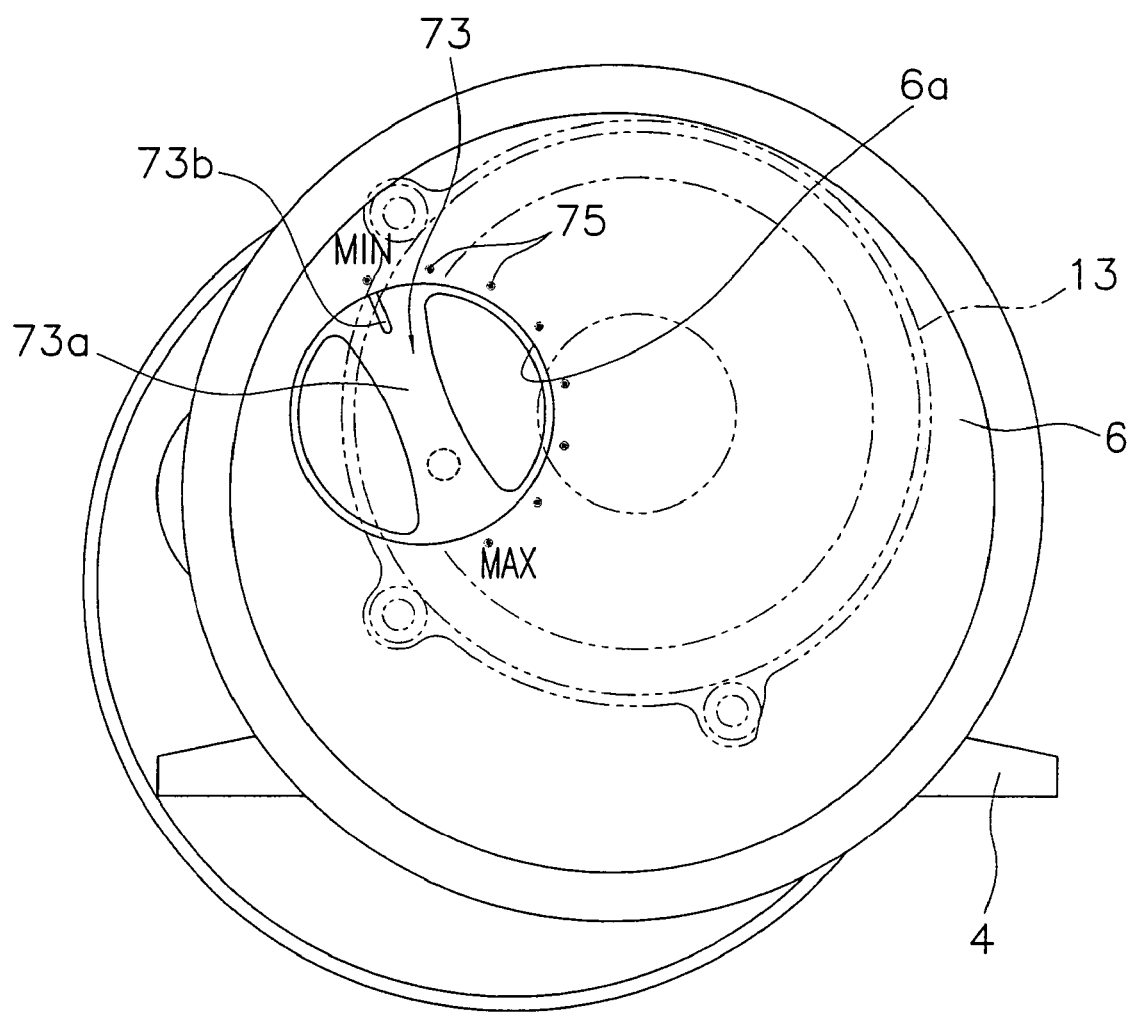
FIG. 5 is a right side view of the dual bearing reel.
Figure 6:
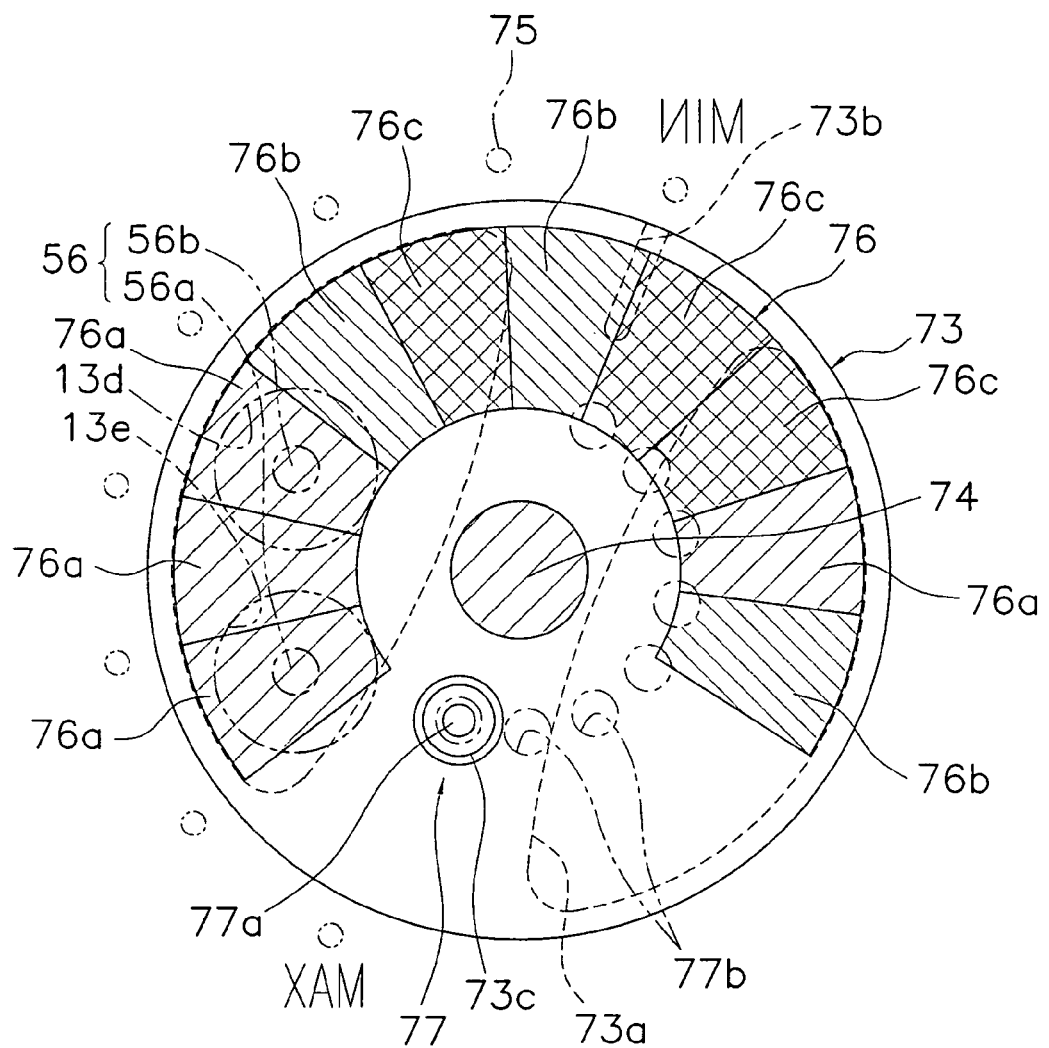
FIG. 6 is a back side view of a brake switch knob of the dual bearing reel.

The brake switch knob 43 is provided so that the braking mode can be set to any one of eight levels. As shown in FIGS. 4 to 6, the brake switch knob 43 is rotatively mounted to the spool support portion 13. The brake switch knob 43 includes, for example, a disk-shaped knob unit 73 that is made of a synthetic resin, and a rotation shaft 74 that is made of metal and positioned in the center of the knob unit 73. The rotation shaft 74 and the knob unit 73 are unitarily formed by insert molding. A knob portion 73a that extends outward is formed on the outer surface of the knob unit 73 that is exposed in the opening 6a. The perimeter of the knob portion 73a is concave in shape, which makes the brake switch knob 43 easy to operate.

An indicator 73b is formed in one end of the knob portion 73a and is slightly concave. Eight marks 75 that face the indicator 73b are formed with a uniform spacing around the perimeter of the opening 6a in the first cover 6 by a suitable method such as printing or with a sticker. Any braking mode can be selected and set by rotating the brake switch knob 43 and lining up the indicator 73b with one of the marks 75. In addition, an identification pattern 76 is formed with a uniform spacing on the back surface of the knob unit 73 by a suitable method such as printing or with a sticker. The identification pattern 76 is used to detect the rotational position of the brake switch knob 43, i.e., which one of the braking modes has been selected. The identification pattern 76 preferably includes three types of ten fan-shaped patterns, first to third patterns 76a, 76b, and 76c in the rotational direction. The first pattern 76a is illustrated with hatching on the lower left portion of FIG. 6, and is, for example, a mirrored surface that reflects light. The second pattern 76b is illustrated with hatching on the lower right portion of FIG. 6, and is, for example, a pattern that is black and thus reflects light with difficulty. The third pattern 76c is illustrated with cross-hatching in FIG. 6, and is, for example, a gray pattern that reflects only approximately half of the light. Which of any of the eight levels of braking mode has have been selected can be identified by the combination of these three types of patterns 76a–76c. Note that if one of the patterns 76a–76c has the same color as that of the knob unit 73, then the back surface of the knob unit 73 may be used as is and a separate pattern need not be formed thereon.

The rotation shaft 74 is mounted in a through hole 13b formed in the wall portion 13a of the spool support portion 13, and is engaged with the wall portion 13a by a retaining ring 78.

A positioning mechanism 77 is provided between the knob unit 73 and the outer surface of the wall portion 13a of the spool support portion 13. The positioning mechanism 77 positions the brake switch knob 43 at a position of the eight levels that correspond to the braking mode, and generates sound when the brake switch knob 43 is rotated. The positioning mechanism 77 includes a positioning pin 77a, eight positioning holes 77b, and an urging member 77c. The positioning pin 77a is mounted in a recessed portion 73c formed in the back surface of the knob unit 73a. The positioning holes 77b engage the tip of the positioning pin 77a. The urging member 77c urges the positioning pin 77a toward the positioning holes 77b. The positioning pin 77a is a rod-shaped member that includes a small diameter head portion, a brim portion having a diameter that is larger than the head portion, and a small diameter shaft portion. The head portion is formed into a hemispherical shape. The positioning pin 77a is mounted in the recessed portion 73c so that it can both project outward and retract inward. The eight positioning holes 77b are formed in a spaced relationship in a fan-shaped auxiliary member 13c that is fixedly held around the periphery of the through hole 13b in the outer surface of the wall portion 13a of the spool support portion 13. The positioning holes 77b are formed so that the indicator 73b will align with any of the eight marks 75.

Referring to FIGS. 3 and 7, the spool control unit 42 includes the circuit board 70 and a controller 55. The circuit board 70 is mounted to the surface of the spool support portion 13 that faces the flange portion 12a of the spool 12. Further, the controller 55 is provided on the circuit board 70.

Referring to FIGS. 3 and 4, the circuit board 70 is a washer-shaped and ring-shaped substrate having a circular opening in the center thereof, and is disposed on the outer peripheral side of the bearing accommodation portion 14 such that it is substantially concentric with the spool shaft 20. The circuit board 70 is preferably attached to the inner side surface of the wall portion 13a of the spool support portion 13 by screws. When the circuit board 70 is to be attached with screws, then a jig that is temporarily positioned on the bearing accommodation portion 14 is used to center the circuit board 70. The circuit board 70 is then disposed so that it is substantially concentric with respect to the spool shaft axis. In this way, when the circuit board 70 is mounted to the spool support portion 13, the coils 62 attached to the circuit board 70 will be disposed so that they are substantially concentric with the spool shaft axis.

Here, since the circuit board 70 is mounted on a surface of the spool support portion 13 that faces the flange portion 12a of the spool 12, the coils 62 mounted around the periphery of the rotor 60 can be directly attached to the circuit board 70. Given this structure, a lead wire that connects the coils 62 and the circuit board 70 will be unnecessary. Further, unneeded insulation between the coils 62 and the circuit board 70 can be reduced. Moreover, since the coils 62 are mounted to the circuit board 70 attached to the spool shaft portion 13, the coils 62 can be mounted to the spool support portion 13 by only attaching the circuit board 70 to the spool support portion 13. Given this arrangement, the spool brake mechanism 25 can be easily assembled.

As seen as in FIGS. 3, 4, and 7, the controller 55 is, for example, composed of a microcomputer provided with a CPU 55a, RAM 55b, ROM 55c and an I/O interface 55d. A control program is stored in the ROM 55c of the controller 55, as well as brake patterns that execute three brake processes (described below) in accordance with each of the eight levels of the braking mode. Thus, the ROM 55c serves as a pattern memory unit. In addition, preset values for tension and rotational speed during each braking mode are also stored in the ROM 55c. Thus, the ROM 55c also serves as a tension pattern setting unit and first and second pattern storage units. The rotational speed sensor 41 and a pattern identification sensor 56 for detecting the rotational position of the brake switch knob 43 are connected to the controller 55. In addition, the gates of each FED 63a of the switch element 63 are connected to the controller 55. The controller 55 controls the on/off state of the switch element 63 of the spool brake unit 40 in response to pulse signals from each sensor 41 and 56 by PWM (pulse width modulated) signals having cycles of, for example, $1/1000$ seconds that are generated by the control program (described below). More specifically, the controller 55 controls the on/off state of the switch element 63 in the eight levels of the braking mode with different duty ratios D. Duty ratio is a ratio of the time in which the switch element 63 is turned on. In other words, duty ratio is expressed as $T_{ON}/T_C$, where $T_{ON}$ is the time in which the switch is turned on and $T_C$ is $1/1000$ sec. In this embodiment, $T_{ON}$ can take any value between $0–1/1000$ sec, in $4/1000000$ sec increments.

Electric power is supplied to the controller 55 from a condenser element 57. This electric power is also supplied to the rotational speed sensor 41 and the pattern identification sensor 56.

Referring now to FIGS. 4, 6, and 7, the pattern identification sensor 56 is provided in order to read out the three types of patterns 76a–76c of the identification pattern 76 formed on the back surface of the knob unit 73 of the brake switch knob 43. The pattern identification sensor 56 is composed of two electro-optical sensors 56a and 56b each having a light and a receptor. The electro-optical sensors 56a and 56b are disposed such that they are vertically aligned on a side of the circuit board 70 that faces the wall portion 13a of the spool support portion 13. Viewing holes 13d and 13e are formed in the wall portion 13a of the spool support portion 13 such that they are vertically aligned, and allow the electro-optical sensors 56a and 56b to acquire each pattern 76a–76c. Here, the eight levels of the braking mode can be identified as will be described below, by reading out the three types of patterns 76a–76c aligned in the rotational direction. Thus, the electro-optical sensors 56a and 56b serve as a pattern selection unit with the controller 55. Further, the electro-optical sensors 56a and 56b serve as first and second pattern read-out units.

As shown in FIG. 6, when the indicator 73b is in the weakest position, the pattern identification sensor will read out reflected light from two of the first patterns 76a. In this state, both electro-optical sensors 56a and 56b will both detect the largest amount of light. Then, if the selector 73b is aligned with the next mark, the electro-optical sensor 56b on the lower side will be positioned on the first pattern 76a and detect a strong amount of light, but the electro-optical sensor 56a on the upper side will be positioned on the second pattern 76b and detect almost no light. The position of the brake switch knob 43 will be identified by combining these detected light amounts.

Referring to FIG. 7, the condenser element 57 employs, for example, an electrolytic condenser, and is connected to a rectifier circuit 58. The rectifier circuit 58 is connected to the switch element 63. The rectifier circuit 58 both converts alternating current from the spool brake unit 40 to direct current (the spool brake unit 40 having the rotor 60 and coils 62 and functions as an electric generator) and also stabilizes the voltage to supply it to the condenser element 57.

Referring now to FIGS. 3, 4, and 7, note that the rectifier circuit 58 and the condenser element 57 are both provided on the circuit board 70. Each unit (including the coils 62) that is provided on the circuit board 70 is covered by a coating film 90 made of a transparent synthetic resin insulating material. More specifically, when each unit is mounted on the circuit board 70 and the wiring is completed, the circuit board 70 is immersed in a tank containing a liquid synthetic resin, and after this the circuit board 70 is removed from the tank, the synthetic resin thereon is hardened to form the coating film 90 on the surface of the circuit board 70. By covering each unit on the circuit board 70 in this manner with a coating film 90 made of an insulating material, liquids can be prevented from entering the electrical components such as the controller 55. Moreover, in this embodiment, it will be unnecessary to replace the electric power source because the electrical power that is generated will be stored in the condenser element 57 and this electrical power will be used to operate the controller 55 and the like. Given this structure, the sealing of the coating film 90 can be made permanent, and trouble caused by unneeded insulation can be reduced.

Operation and Function of the Reel During Actual Fishing

Referring initially to FIGS. 1, 4, and 7 when casting, the clutch lever 17 is pressed down to place the clutch mechanism 21 in the clutch off position. In this clutch off state, the spool 12 can rotate freely, and the fishing line will unwind from the spool 12 at full speed when casting due to the weight of the tackle. When the spool 12 rotates due to casting, the magnets 61 rotate around the inner peripheral sides of the coils 62, and if the switch element 63 is on, an electric current will flow through the coils 62 and the spool 12 will be braked. During casting, the rotational speed of the spool 12 will gradually become faster, and will be gradually reduced if a peak is exceeded.

Here, even if the magnets 61 are disposed near the bearing 26b, it will be difficult for the bearing 26b to become magnetized and the ability of the spool 12 to rotate freely will improve because the magnetic washer member 66 is disposed between the magnets 61 and the bearing 26b and because there is a gap of 2.5 mm or greater between the magnets 61 and the bearing 26b. In addition, it will be difficult for cogging to be produced and the ability of the spool 12 to rotate freely will improve because the coils 62 are coreless coils.

When the tackle lands in the water, the clutch mechanism 21 will be placed in the clutch on state by rotating the handle 2 in the line winding direction and by a clutch return mechanism (not shown in the figures), and the reel unit 1 will be palmed to await a bite from a fish.

Control Operation of the Controller

Next, the brake control operation performed by the controller 55 during casting will be described with reference to the control flowcharts of FIGS. 8 and 9 and the graphs in FIGS. 10 and 11.

Initialization occurs at Step S1 when the spool 12 rotates due to casting, electric power is stored in the condenser element 57, and an electric power supply flows into the controller 55. Here, various flags and variables are reset. In Step S2, it is determined whether a braking mode or a braking pattern BMn has been selected by the brake switch knob 43 (n is an integer between 1 and 8). At Step S3, the braking mode that was selected is set as braking mode BMn. When this occurs, a duty ratio D that corresponds to the braking mode BMn will be read out from the ROM inside the controller 55. At Step S5, a rotational speed V of the spool 12 when casting begins is detected by pulses from the rotational speed sensor 41. At Step S7, tension F applied to the fishing line released from the spool 12 is computed.

Here, the tension F can be determined from the rate of change of the rotational speed of the spool 12 ($\Delta\omega/\Delta t$) and the moment of inertia J of the spool 12. When the rotational speed of the spool 12 changes at a certain point, the difference between this rotational speed and the rotational speed of the spool 12 when it freely and independently rotates without receiving tension from the fishing line is due to rotational drive force (torque) generated by the tension from the fishing line. If we assume that the rate of change of the rotational speed at this time is ($\Delta\omega/\Delta t$), then the drive torque T can be expressed as equation (1) below.

$$T = J \times (\Delta\omega/\Delta t) \tag{1}$$

If the drive torque T is determined from equation (1), the tension from the radius of the point of application of the fishing line (normally 15 to 20 mm) can be determined. The present inventors discovered that if a large braking force is applied when this tension is at or below a predetermined value, the attitude of the tackle (lure) will reverse and stabilize just before the peak rotational speed of the spool 12 and the tackle will fly efficiently. The following control is carried out in order to brake the spool 12 just before its peak rotational speed and make the tackle fly with a stable attitude. In other words, a strong braking force will be applied to the spool 12 for a short period of time at the beginning of casting to make the tackle reverse and attain a desirable casting attitude, and after this the spool 12 will be braked with a braking force that gradually weakens to a constant amount during casting. Finally, the spool 12 will be braked with a braking force that gradually weakens until the number of rotations of the spool 12 falls below a predetermined value. The controller 55 will carry out these three braking processes. Thus, the controller 55 also functions as a torque computation unit.

In Step S8, it is determined whether the tension F computed by the rate of change of the rotational speed ($\Delta\omega/\Delta t$) and the moment of inertia J is at or below a predetermined value Fs (for example, a value in a range between 0.5 N and 1.5 N). If the tension F exceeds the predetermined value Fs, then the process moves to Step S9, the duty ratio D is set to 10 (i.e., the switch element 63 is turned on for only 10% of a cycle), and the process returns to Step S2. When this occurs, the spool brake unit 40 slightly brakes the spool 12, but the spool control unit 42 will stably operate because the spool brake unit 40 generates electricity.

If the tension F is at or below the predetermined value Fs, then the process moves to Step S10. In Step S10, a timer for the first predetermined time period T1 is started. This first predetermined time period T1 is the length of time during which a first braking process that brakes the spool 12 with a strong braking force will be applied.

At Step S11, it will be determined whether the timer for the first predetermined time period T1 has timed out. If the timer for the first predetermined time period T1 has not timed out, then the process moves to Step S12 and the first braking process is carried out during casting until the timer for the first predetermined time period T1 times out. As shown by the hatching in the lower left portion of FIG. 10, this first braking process brakes the spool 12 with a first duty ratio Dn1 for a predetermined first time period to be timed by the timer for the first predetermined time period T1. The first duty ratio Dn1 is determined by the rotational speed V detected at Step S5 and the braking mode selected at Step S3, and does not change during the first time period T1. In other words, the first duty ratio Dn1 is the smaller of a predetermined value that is determined for each of the braking modes, and a value that is computed by a function f1 (V, n), in which the spool rotational speed V at the beginning of casting is multiplied by a predetermined value that is determined in accordance with the braking mode. Thus, $$Dn1 = \min(f1(V, n), DnS) \tag{2}$$

This first duty ratio Dn1 is for example 50 to 100% duty (on for 50% to 100% of the entire cycle), and preferably in a range between 70 to 90% duty. In addition, the first time period T1 is preferably in a range between 0.1 to 0.3 seconds. When braking occurs within this time range, it will be easier to brake the spool 12 before it reaches its peak rotational speed.

Figure 10:
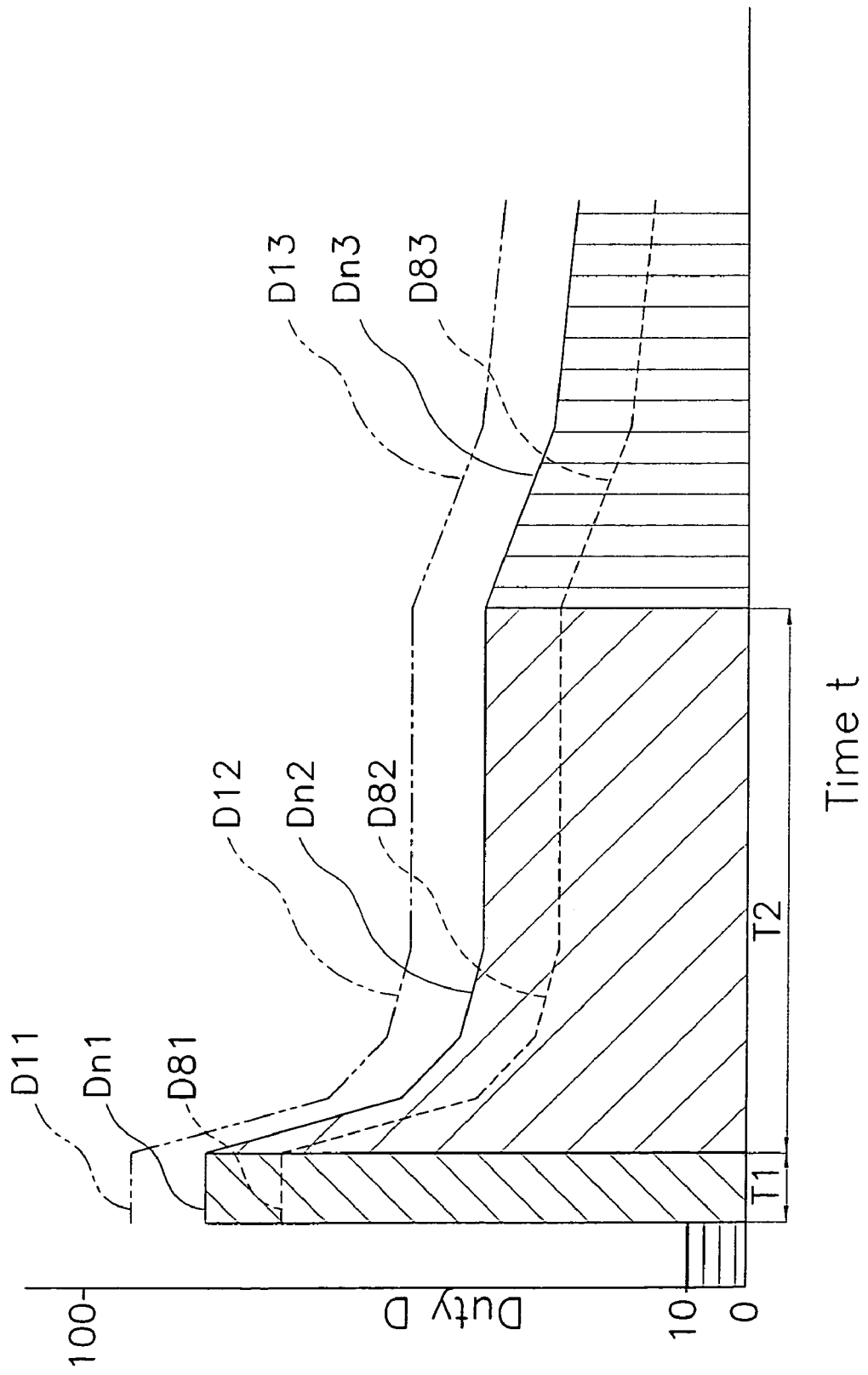
FIG. 10 is a view of a graph that schematically illustrates the change in the duty ratios of each control process.
Figure 11:
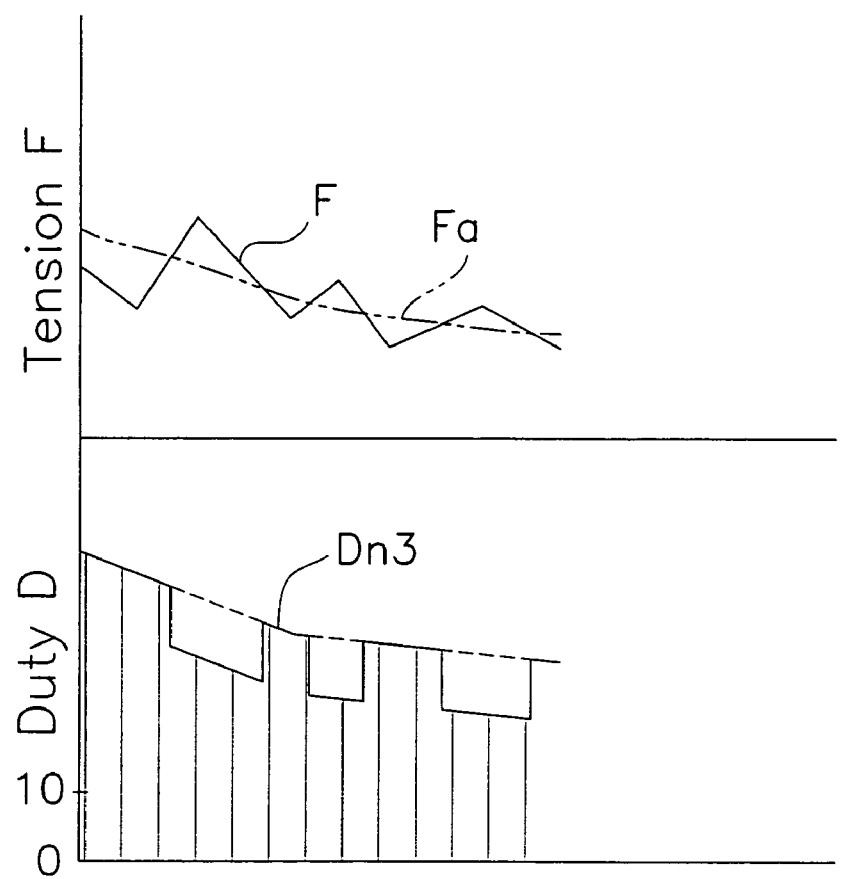
FIG. 11 is a view of graphs that schematically illustrate a correction process of a third control process of the controller.

The first duty ratio Dn1 is shifted up or down depending upon the braking mode BMn, as shown in FIG. 10. (In FIG. 10, n indicates any integer between 1 and 8.) In this embodiment, when the braking mode is at the highest value (n=1), a duty ratio D11 will be the maximum and will gradually decrease from this point. When a strong braking force is applied for a short period of time like described above, the attitude of the tackle will reverse from its fishing line engagement portion to a stable casting attitude, the fishing line engagement portion will be in front, and the tackle will fly efficiently. When this occurs, the attitude of the tackle will be stable, and thus the tackle will fly farther.

On the other hand, when the first time period T1 times out, the process moves from Step S11 to Step S13. At Step S13, it will be determined whether a timer for a second time period T2 has already started. If the timer for the second time period T2 has started, then the process moves to Step S17. If the timer for the second time period T2 has not started, then the process moves to Step S14, where the length of the second time period T2 is determined as follows:

$$T2 = f2(V) \times TS \tag{3},$$

where TS is a constant. In other words, the second time period T2 is determined based on the rotational speed V at the beginning of casting. The second time period T2 is the length of time that a second braking process will be carried out. The process then proceeds to Step S15. At Step S15, the timer for the second predetermined time period T2 is started. Then, the process proceeds to Step S17.

At Step S17, it is determined whether the timer for the second predetermined time period T2 has timed out. If the timer for the second predetermined time period T2 has not timed out, then the process moves to Step S18 and the second braking process is carried out until the timer for the second predetermined time period T2 times out.

In Step 18, a duty ratio Dn2 is calculated. As shown by the hatching in the lower right portion of FIG. 10, the second braking process brakes the spool 12 during the second predetermined time period T2 at a duty ratio Dn2 that decreases rapidly initially, then decreases gradually, and remains at a constant value finally. Thus, $$Dn2 = f3(t) \tag{4}$$

The function f2 is any function whose variable is the time t, and which decreases rapidly initially and then gradually, and remains substantially constant over time. Examples of such function f2 include exponential curves and a curve shown in FIG. 10.

The minimum value of the duty ratio Dn2 is preferably in a range between, for example, 30 and 70%. In addition, the second predetermined time period T2 is preferably between 0.3 to 2 seconds.

Figure 9:
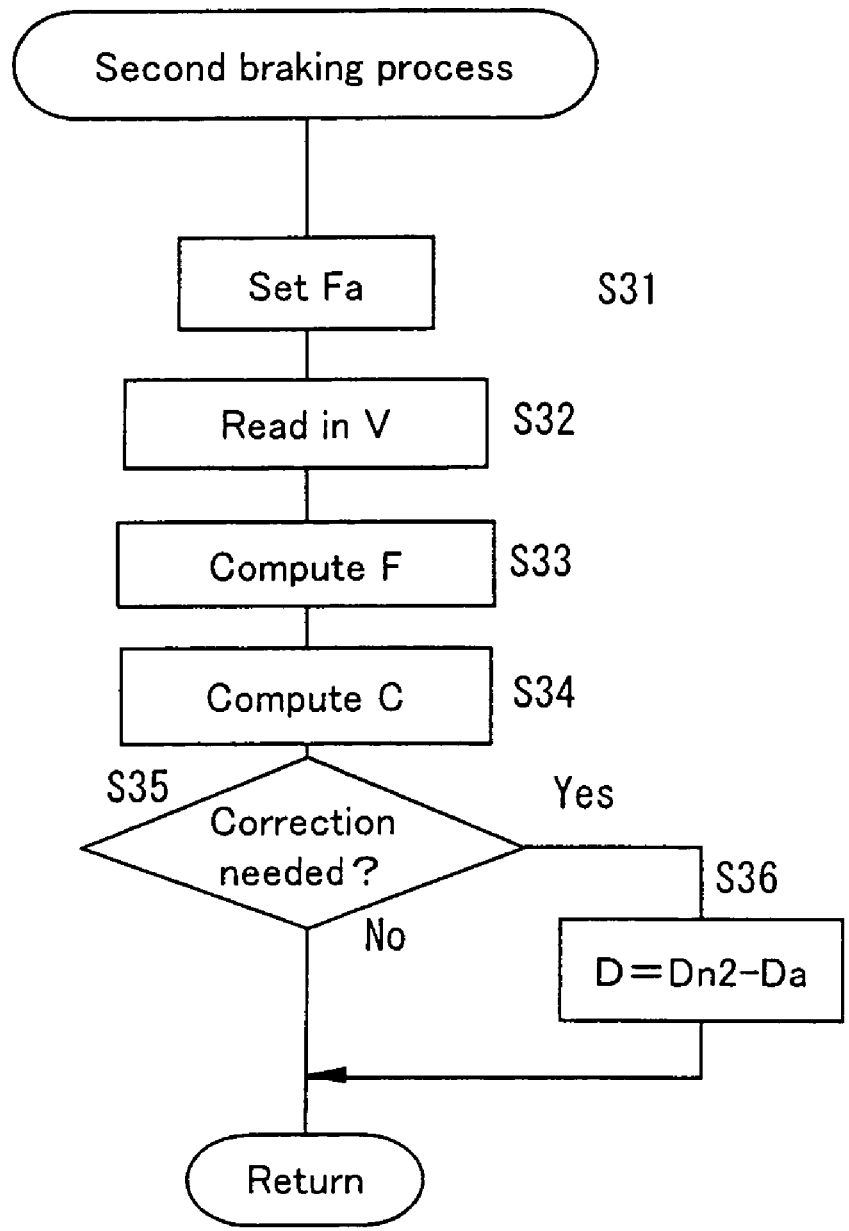
FIG. 9 is a view of a flowchart showing a second control process of the controller.

During the calculation of the duty ratio Dn2, the second braking force calculation process shown in FIG. 9 is performed simultaneously. The braking force correction process is carried out after the calculation of the duty ratio Dn2 for the purpose of cutting extraneous braking force. In Step S31 of FIG. 9, a correction tension Fa (an example of tension pattern) is set. The correction tension Fa is set based on a predetermined function of time. An example of such function of the correction tension Fa is shown by the dotted line in FIG. 11. However, the function of the correction tension Fa may be any function that gradually declines over time.

The speed V is read in at Step S32. At Step S33, the tension F is computed in the same sequence as in Step S7. At Step S34, a criterion expressed by the following equation (5) is computed from the tension obtained in Step S33. At Step S35, it is determined whether brake correction is needed from the criterion.

$$i\ C = SSa \times (F - SSd \times \text{rotational speed}) - (\Delta F/\Delta t) \tag{5}$$

Here, SSa and SSd are coefficients with respect to the rotational speed (rpm). SSa indicates a tension correction gain, and is for example 50. In addition, SSd indicates a tension correction level, and is 0.000005 in this embodiment.

When C is greater than zero in the equation (5), in other words when it is determined that the computed value of the tension F exceeds the set tension Fa by a large amount, then it is determined in Step S35 that the answer is "Yes," and the process moves to Step S36. At Step S36, the second duty ratio Dn2 that was calculated in Step S18 will be corrected by subtracting a fixed amount Da by the next sampling cycle (normally each rotation).

Figure 8:
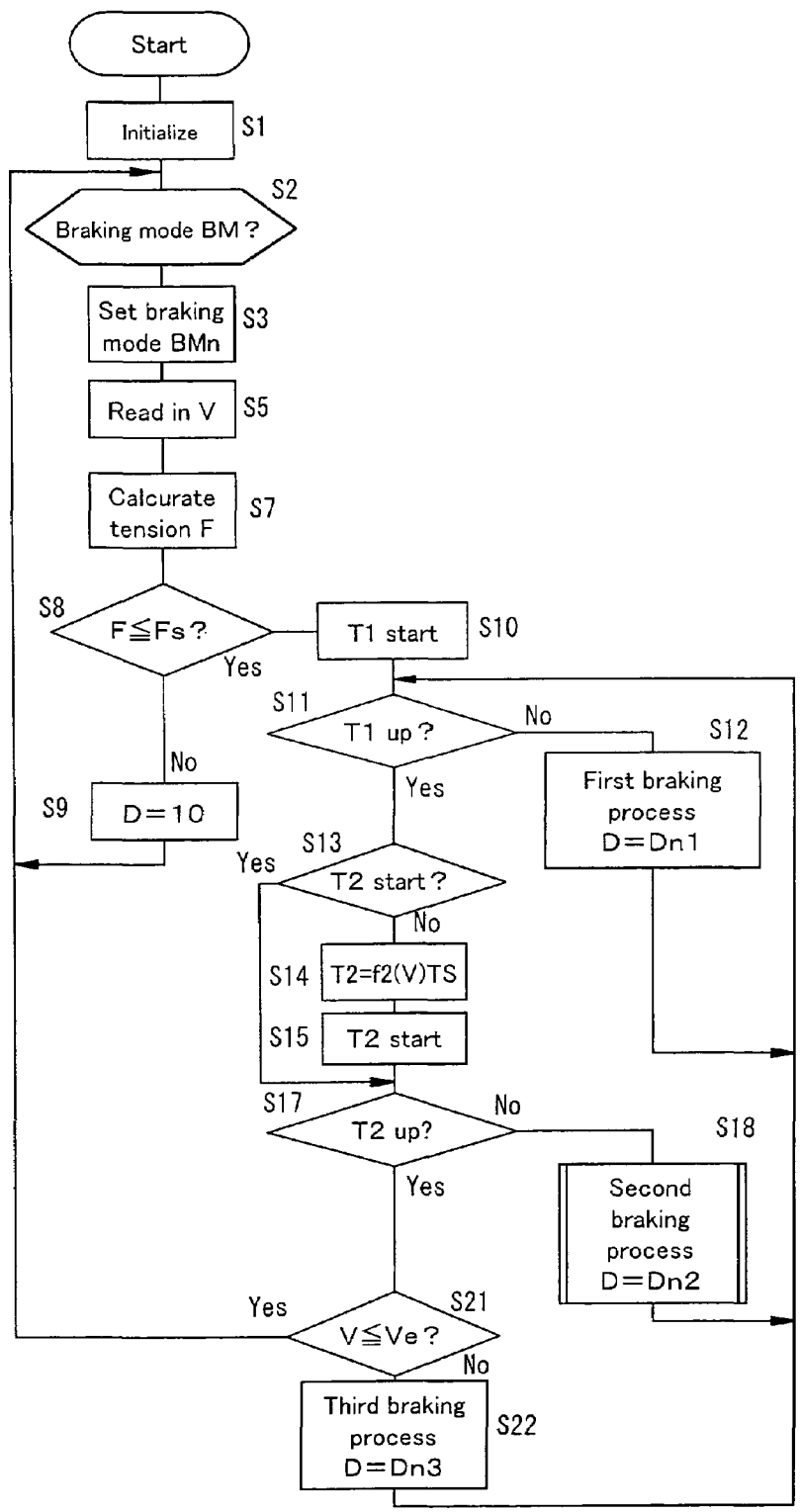
FIG. 8 is a view of a flowchart showing a primary control process of a controller of the dual bearing reel.

Referring now to FIG. 8, once the second predetermined time period T2 runs out, at Step S21, it is determined whether the speed V is at or below a predetermined brake completion speed Ve. If the speed V exceeds the brake completion speed Ve, then the process moves to Step S22. The third braking process is carried out at Step S22. As shown by the vertical hatching in FIG. 10, the third braking process brakes the spool 12 with a duty ratio Dn3 that changes over time like the second braking process and in which the rate of decline gradually becomes smaller. In other words, $$Dn3 = f4(t) \tag{4}$$

The function f4 is any function whose variable is the time t, and which decreases gradually. An example of such function f4 is shown in FIG. 10.

After the calculation of the duty ratio Dn3, the brake correction process discussed above follows. FIG. 11 illustrates the brake correction process in the third braking process. Since the brake correction process performed after the calculation of the duty ratio Dn3 is the same as that performed during the second braking force calculation process, further explanation of the brake correction process will be omitted herein.

Then, the process returns to Step S11, and at Step S21 the process continues until the speed V is at or lower than the brake completion speed Ve or the brake correction process is executed in the third braking process.

If the speed V is at or below the brake completion speed Ve, then the process returns to Step S2.

Here, if the spool 12 is braked with a strong braking force before the rotational speed of the spool 12 peaks, tension that was at or below the first predetermined value Fs will be rapidly increased, backlash will be prevented, and the tackle will fly in a stable manner. Given this structure, backlash can be prevented, the attitude of the tackle can be stabilized, and the tackle can be cast farther.

In addition, since the spool is controlled in three braking processes with different duty ratios and braking times in accordance with the rotational speed of the spool at the beginning of casting, the spool will be braked with duty ratios and braking times that differ depending upon the rotational speed of the spool, even when the settings are the same. Due to the aforementioned arrangement, it will be unnecessary to adjust manually the braking force even if casting is performed with different spool rotational speeds, and thus the burden on the fisherman can be reduced.

SECOND EMBODIMENT

Figure 12:
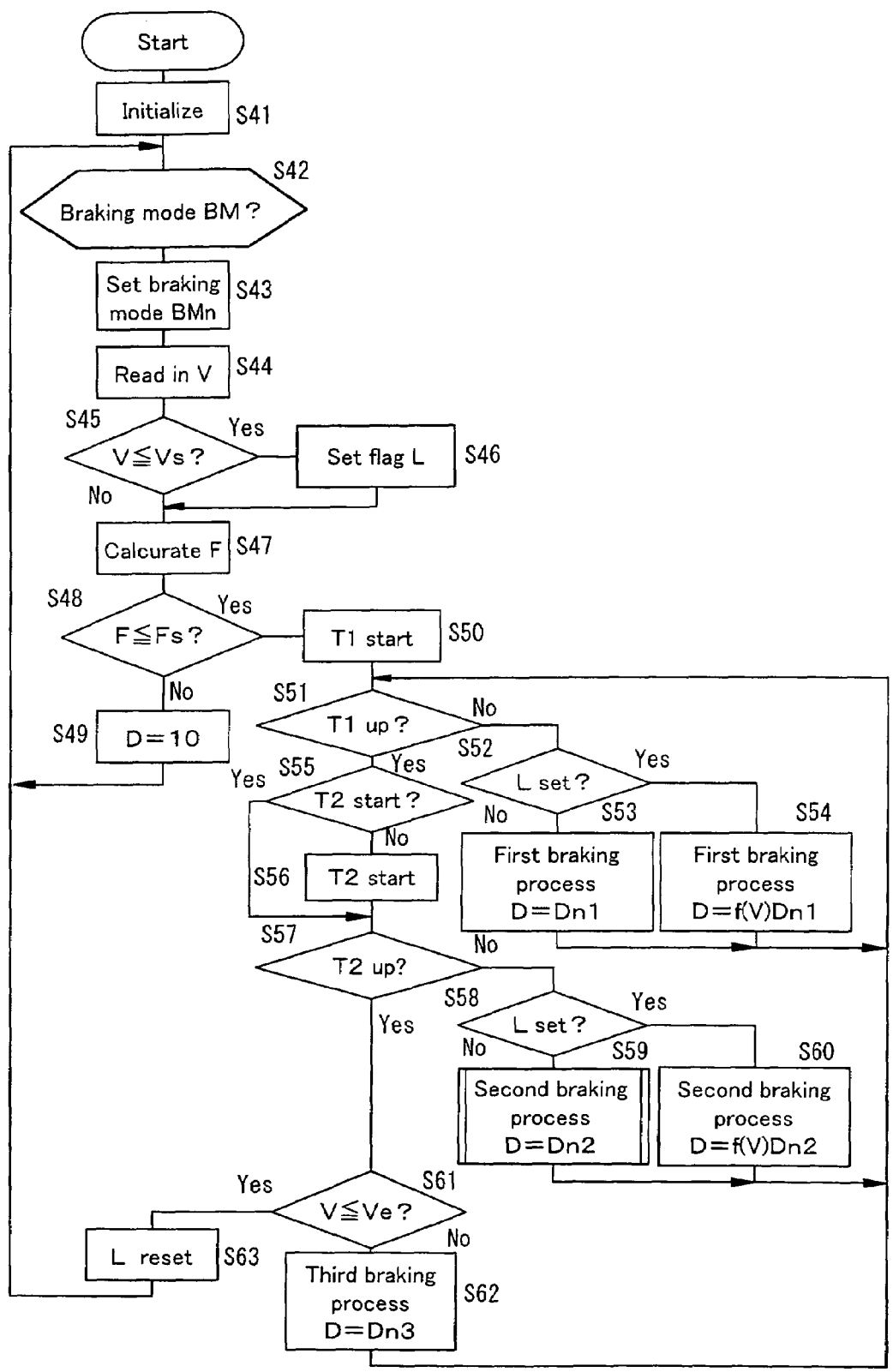
FIG. 12 is a view of a flowchart showing a primary control process of a controller of the dual bearing reel in accordance with a second embodiment of the present invention.

In the first embodiment, the first braking process is modified depending on the rotational speed V of the spool 12. In the second embodiment, the spool 12 is braked at a constant duty ratio regardless of the rotational speed of the spool 12, if the rotational speed of the spool 12 is greater than a predetermined value. Next, the brake control operation of the controller 55 during casting will be explained with reference to the control flow chart shown in FIG. 12.

Initialization occurs at Step S41 when the spool 12 rotates due to casting, electric power is stored in the condenser element 57, and an electric power supply flows into the controller 55. Since the processes from Step S41 through Step S43, from Step S47 through Step S49, and from Step S61–63 are the same as those of Step S1 through S3 and Step S7 through S9, and from Step S21–23, explanation thereof will be omitted herein.

In Step S44, the rotational speed V of the spool 12 is detected based on the pulses from the rotational speed sensor 41. In Step S45, it is determined whether the rotational speed V is equal to or smaller than a predetermined rotational speed Vs (for instance 12000 rpm). If the rotational speed V is equal to or smaller than the predetermined rotational speed Vs, the process proceeds to Step S46 and sets a flag L. This flag L is set so that an excessive braking force will not be generated during short-distance casting such as under-hand casting and pitching, where the initial rotational speed of the spool is slow. Once the flag L is set, the process proceeds to Step S47.

If the detected rotational speed V is greater than the predetermined rotational speed Vs, the process proceeds to Step S47. At Step S47, tension F applied to the fishing line released from the spool 12 is computed, as in the first embodiment.

In Step S48, it is determined whether or not the tension F computed by the rate of change of the rotational speed ($\Delta\omega/\Delta t$) and the moment of inertia J is equal to or smaller than a predetermined value Fs (for example, a value in a range between 0.02 N and 0.05 N). If the tension F is equal to or smaller than the predetermined value Fs, then the process moves to Step S50. In Step S50, a timer T1 is started. This timer T1 determines the length of time during which a first braking process will be applied that brakes the spool 12 with a strong braking force. At Step S51, it is determined whether or not the timer T1 has timed out. If the timer T1 has not timed out, then the process moves to Step S52, where it is determined whether or not the flag L has been set. In this way, it can be determined whether a flat cast or a full cast is being performed, and the braking force can be modified even in the same braking mode BMn. If the flag L is not set, the process moves to Step S53 (an example of first braking pattern means) and the first braking process for a full cast will be performed until the timer T1 times out. In this case, as shown by the hatching in the lower left portion of FIG. 10, this first braking process brakes the spool 12 for only a time T1 with a fixed first duty ratio Dn1. This first duty ratio Dn1 is for example 50 to 100% duty (on for 50% to 100% of the entire cycle), and preferably in a range between 70 to 90% duty. In addition, the time T1 is preferably in a range between 0.1 to 0.3 seconds. When braking occurs within this time range, it will be easier to brake the spool 12 before it reaches its peak rotational speed.

In this embodiment, the first duty ratio Dn1 is a constant value that is set for each of the braking mode BMn. The first duty ratio Dn1 is stored in and read out from the controller 55 (first pattern storage means, first pattern read-out means, and pattern selection means). The first duty ratio Dn1 is shifted up or down depending upon the braking mode BMn. In this embodiment, when the braking mode is at the highest value (n=1), a duty ratio D1 will be the maximum and will gradually decrease as the braking mode BMn is shifted. When a strong braking force is applied for a short period of time as described above, the attitude of the tackle will reverse from its fishing line engagement portion, such that the fishing line engagement portion will be in front, and the tackle will fly. When this occurs, the attitude of the tackle will be stable, and thus the tackle will fly further.

When the flag L is set, the process moves from Step S52 to Step S54. At Step S54, the first braking process for a light cast (an example of second braking pattern setting means) will be performed until the timer T1 times out. In the first braking process for a light cast, the duty ratio Dn1 for a full cast is corrected downward with a function f(V) in accordance with the detected rotational speed V so that the braking force will be reduced. When these processes are completed, the process will return to Step S51.

On the other hand, when the timer T1 times out, the process moves from Step S51 to Step S55. At Step S55, it is determined whether or not a timer T2 has already started. If the timer T2 has started, then the process moves to Step S57. If the timer T2 has not started, then the process moves to Step S56, where the timer T2 is started. The timer T2 determines the length of time during which a second braking process will be carried out.

At Step S57, it is determined whether or not the timer T2 has timed out. If the timer T2 has not timed out, then the process moves to Step S58, where it is determined whether or not the flag L has been set. This determination is performed for the same reason as that in Step S52. If the flag L is not set, the process moves to Step S59 and the second braking process for a full cast will be performed until the timer T2 times out. As shown by the hatching in the lower right portion of FIG. 10, the second braking process brakes the spool 12 during the time period T2 at a duty ratio Dn2 that drops rapidly at first, then drops gradually, and finally remains at a constant value. The minimum value of the duty ratio Dn2 is preferably in a range between, for example, 30 and 70%. In addition, the second predetermined time T2 is preferably between 0.3 to 2 seconds.

In addition, a brake correction process like that shown in FIG. 9 is carried out in the second braking process and a third braking process for the purpose of cutting extraneous braking force.

The second duty ratio Dn2 is shifted up or down depending upon the braking mode BMn. In this embodiment, when the braking mode is at the highest value (n=1), a duty ratio D12 will be the maximum and will gradually decrease as the braking mode BMn is shifted. When the flag L is set, the process moves from Step S58 to Step S60. At Step S60, the second braking process for a light cast will be performed. In the second braking process for a light cast, the duty ratio for a full cast is corrected downward with the function f(V) in accordance with the detected rotational speed V so that the braking force will be reduced. When these processes are completed, the process will returns to Step S51.

In this embodiment, the second duty ratio Dn2 is a constant value that is set for each of the braking mode BMn. The second duty ratio Dn2 is stored in and read out from the controller 55 (second pattern storage means and second pattern read-out means). The second duty ratio Dn2 is shifted up or down depending upon the braking mode BMn. In this embodiment, when the braking mode is at the highest value (n=1), a duty ratio D12 will be the maximum and will gradually decrease as the braking mode BMn is shifted.

In Step S57, if it is determined that the time period T2 is up, the process proceeds to Step S61.

At Step S61, it is determined whether or not the rotational speed V is at or below a brake completion speed Ve. If the rotational speed V exceeds the brake completion speed Ve, then the process moves to Step S62. The third braking process is carried out at Step S62.

As shown by the vertical hatching in FIG. 10, the third braking process brakes the spool 12 with a duty ratio Dn3 that changes over time like the second braking process, and in which the rate of decline gradually becomes smaller. Then, the process returns to Step S51. This process continues until it is determined in Step S61 that the speed V is at or lower than the brake completion speed Ve. The brake correction process is executed also during the third braking process.

When the rotational speed V is at or below the brake completion speed Ve, the process moves from Step 61 to Step S63, where the flag L is reset. The process then returns to Step S42.

Here, if the spool 12 is braked with a strong braking force before the rotational speed of the spool 12 peaks, tension that was at or below the first predetermined value Fs will be rapidly increased, backlash will be prevented, and the tackle will fly in a stable manner. Because of this, backlash can be prevented, the attitude of the tackle can be stabilized, and the tackle can be cast out further.

In addition, because the spool 12 is controlled in three braking processes with different duty ratios and in accordance with the rotational speed of the spool during casting, the spool 12 will be braked with duty ratios that differ depending upon the rotational speed of the spool, even when the settings are the same. Because of this, it will be unnecessary to manually adjust the braking force even if casting is performed with different spool rotational speeds, and thus the burden on the fisherman can be reduced.

ALTERNATE EMBODIMENTS

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

(a) In the aforementioned embodiment, the tension applied to the fishing line is determined from the rotational speed of the spool, but the tension may be directly measured by mounting a strain gauge or the like on the spool shaft.

(b) In the aforementioned embodiment, a spool brake unit that brakes the spool by generating electricity was described, but the spool brake unit may be any type of device so long as it is electrically controllable. For example, the spool brake unit may be one in which a brake shoe or a brake pad is brought into contact with a drum or a disk by an electrically controllable actuator.

(c) In the aforementioned embodiment, the second and third braking processes brake the spool with a braking force that changes, but the spool may be braked in these processes with a constant braking force.

(d) In the aforementioned embodiment, the low speed braking pattern is computed by employing the function f(V) in accordance with the speed from the high speed braking pattern. However, the function f(V) may be stored in advance in the ROM 55. When this occurs, a plurality of functions may be stored in accordance with speed.

(e) In the aforementioned embodiment, the eight braking patterns that correspond to the eight levels of braking mode are stored in the ROM 55c. However, only one reference braking pattern may be stored in the ROM 55c and the other seven braking patterns, for example, may be computed.

(f) In the aforementioned embodiment, the duty ratio is shifted up and down to set the eight braking patterns. However, the eight braking patterns may be set to any state so long as the braking forces are different.

According to the present invention, if the spool is braked with a strong braking force before the rotational speed of the spool peaks, tension that was at or below the first predetermined value will be rapidly increased, backlash will be prevented, and the lure will fly in a stable manner. Due to this structure, backlash can be prevented, the attitude of the lure can be stabilized, and the lure can be cast farther.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially," "about," and "approximately" as used herein mean a reasonable amount of deviation of the modified term such that the result is not significantly changed. For example, these terms can be construed as including a deviation of at least ±5% of the modified term if this deviation would not negate the meaning of the word it modifies.

This application claims priority to Japanese Patent Application Nos. 2000-000646 and 2003-000647. The entire disclosures of Japanese Patent Application No. 2000-000646 and 2003-000647 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool braking device for a dual bearing reel that brakes a spool that is rotatively mounted on a reel unit, comprising:
    an electrically controllable spool braking unit being arranged between the spool and the reel unit, said electrically controllable spool braking unit being configured to brake the spool;
    a tension detection unit being configured to detect tension applied to fishing line released from the spool during casting; and
    a spool control unit being configured to control electrically said spool braking unit such that when the tension detected by said tension detection unit falls, after having increased due to rotation of the spool, below a first predetermined value before a rotational speed of the spool reaches its maximum value, the spool is braked with a first constant braking force for a first predetermined time period.

2. The spool braking device for a dual bearing reel according to claim 1, wherein
    said spool braking unit includes,
        a plurality of magnets with sequentially different polarities that are aligned in a rotational direction,
        a plurality of serially connected coils mounted on the reel unit and disposed around a periphery of said magnets in a circumferential direction, said serially connected coils being arranged with gaps therebetween, and
        a switch unit connected to both ends of said plurality of serially connected coils, wherein said spool control unit controls said spool braking unit by controlling an on/off state of said switch unit.

3. The spool braking device for a dual bearing reel according to claim 2, wherein
    said spool control unit controls an on/off state of said switch unit by pulse width modification control.

4. The spool braking device for a dual bearing reel according to claim 3, wherein
    when said spool control unit controls said on/off state of said switch unit at a 50 to 100% duty ratio, the spool is configured to be braked with said first braking force by said spool braking unit.

5. The spool braking device for a dual bearing reel according to claim 1, wherein
    said first predetermined time period is in a range between 0.1 and 0.5 seconds.

6. The spool braking device for a dual bearing reel according to claim 1, wherein
    said first predetermined value is in a range between 0.5N and 1.5N.

7. The spool braking device for a dual bearing reel according to claim 1, wherein
    said tension detection unit includes,
        a speed detection unit that optically detects a rotational speed of the spool, and
        a torque computation unit that computes a drive torque that rotates the spool by a rate of change of the rotational speed detected by said speed detection unit and a moment of inertia of the spool, and
    said tension is detected by a computed drive torque.

8. The spool braking device for a dual bearing reel according to claim 7, wherein
    said spool control unit determines the first braking force based on the rotational speed of the spool detected by said speed detection unit.

9. The spool braking device for a dual bearing reel according to claim 1, wherein
    after said first predetermined time period, said spool control unit controls said spool braking unit to brake the spool for a second predetermined time period with a second braking force that is weaker than the first braking force and is configured to become weaker.

10. The spool braking device for a dual bearing reel according to claim 9, wherein
    said tension detection unit includes a speed detection unit that optically detects a rotational speed of the spool, and
    said spool control unit determines the second predetermined time period based on the rotational speed of the spool detected by said speed detection unit.

11. The spool braking device for a dual bearing reel according to claim 9, wherein
    said second predetermined time period is in a range between 0.3 and 2 seconds.

12. The spool braking device for a dual bearing reel according to claim 9, further comprising,
    tension pattern setting means that sets a tension pattern, based on which the second braking force is determined,
    wherein said spool control unit corrects said second braking force in response to said tension pattern while said spool control unit controls said spool braking unit during said second predetermined time period with said second braking force.

13. The spool braking device for a dual bearing reel according to claim 9, further comprising,
    first braking pattern setting means that sets at least one first braking pattern that indicates at least said first braking force, and
    second braking pattern setting means that sets at least one second braking pattern that indicates at least said second braking force that is smaller than said first braking force of said first braking pattern,
    wherein said spool control unit that electrically controls said spool braking unit so that the spool is braked with said at least one first braking pattern when the spool rotational speed is equal to or greater than a predetermined value and with said at least one second braking pattern when said spool rotational speed is below the predetermined value.

14. The spool braking device for a dual bearing reel according to claim 1, further comprising,
    pattern memory means having a plurality of control patterns stored therein, each of said plurality of control patterns being different at least in one of said first braking force, said first predetermined value, and said first predetermined time period, and pattern selection means that selects one control pattern from said plurality of control patterns stored in said pattern memory unit, wherein said spool control unit controls said spool braking unit based on said control pattern selected by said pattern selection means.

15. The spool braking device for a dual bearing reel according to claim 13, wherein said first braking pattern setting means includes,
first pattern storage means in which at least one first braking pattern is stored, and
first pattern read-out means that reads out said at least one first braking pattern.

16. The spool braking device for a dual bearing reel according to claim 15, wherein, said first pattern storage means has stored therein a plurality of first braking patterns that correspond to different braking forces, and said first braking pattern setting means further includes pattern selection means that selects any of said plurality of first braking patterns stored in said first pattern storage unit, wherein said first pattern read-out means reads out a selected first braking pattern from said first pattern storage means.

17. The spool braking device according to claim 13, wherein said first braking pattern setting means further includes
first pattern storage means for storing a reference braking pattern,
first braking pattern computation means that computes a plurality of different first braking patterns that have different braking forces from that of said reference braking pattern, and
pattern selection means that selects a first braking pattern from said reference braking pattern and said plurality of first braking patterns that were computed, and said first braking pattern setting means sets a first braking pattern that said pattern selection means selected from said reference braking pattern stored in said first braking pattern storage means and said computed first braking patterns.

18. The spool braking device for a dual bearing reel according to claim 17, wherein said first braking pattern computation means computes said plurality of first braking patterns such that said plurality of first braking patterns have braking forces that are smaller than the braking force of the reference braking pattern.

19. The spool braking device for a dual bearing reel according to claim 13, wherein said second braking pattern setting means includes,
second pattern storage means in which said at least one second braking pattern is stored, and
second pattern read-out means that reads out said at least one second braking pattern stored in said second pattern storage means.

20. The spool braking device for a dual bearing reel according to claim 13, wherein said second braking pattern setting means computes and sets said second braking pattern based on said first braking pattern.

* * * * *